US012359476B2

(12) United States Patent
Cetnar et al.

(10) Patent No.: US 12,359,476 B2
(45) Date of Patent: Jul. 15, 2025

(54) CLOSURE LATCH ASSEMBLY WITH POWER LATCH RELEASE MECHANISM HAVING DUAL DRIVE POWER RELEASE ACTUATOR AND MULTI-STAGE GEARSET

(71) Applicant: MAGNA CLOSURES INC., Newmarket (CA)

(72) Inventors: Roman Cetnar, Newmarket (CA); Francesco Cumbo, Pisa (IT)

(73) Assignee: MAGNA CLOSURES INC., Newmarket (CA)

(*) Notice: Subject to any disclaimer, the term of this patent is extended or adjusted under 35 U.S.C. 154(b) by 208 days.

(21) Appl. No.: 17/860,054

(22) Filed: Jul. 7, 2022

(65) Prior Publication Data

US 2023/0009439 A1 Jan. 12, 2023

Related U.S. Application Data

(60) Provisional application No. 63/238,730, filed on Aug. 30, 2021, provisional application No. 63/219,808, filed on Jul. 8, 2021.

(51) Int. Cl.

| | |
|---|---|
| ***E05B 81/34*** | (2014.01) |
| ***E05B 81/06*** | (2014.01) |
| ***E05B 81/14*** | (2014.01) |

(52) U.S. Cl.

CPC .............. *E05B 81/34* (2013.01); *E05B 81/06* (2013.01); *E05B 81/14* (2013.01); *E05Y 2800/25* (2013.01); *E05Y 2900/531* (2013.01)

(58) Field of Classification Search

CPC .......... E05B 81/34; E05B 81/06; E05B 81/14; E05B 81/16; E05B 77/02

See application file for complete search history.

(56) References Cited

U.S. PATENT DOCUMENTS 4,518,180 A * 5/1985 Kleefeldt ................ E05B 81/20 292/216
6,386,599 B1 * 5/2002 Chevalier ............... E05B 77/28 292/201

(Continued)

FOREIGN PATENT DOCUMENTS

CN 108868390 A * 11/2018 ............. E05B 79/10
DE 19710531 A1 * 9/1998 ............. E05B 77/12

(Continued)

OTHER PUBLICATIONS

Espacenet, machine translation of DE 19710531 A1, generated Jun. 25, 2024. (Year: 2024).*

(Continued)

*Primary Examiner* — Kristina R Fulton
*Assistant Examiner* — Emily G. Brown
(74) *Attorney, Agent, or Firm* — Dickinson Wright PLLC

(57) ABSTRACT

A power latch assembly for a vehicle door of a motor vehicle includes a ratchet configured for movement between striker capture and striker release positions, wherein the ratchet is biased toward the striker release position, and a pawl configured for movement between a ratchet holding position, whereat the pawl maintains the ratchet in the striker capture position, and a ratchet releasing position, whereat the pawl releases the ratchet to the striker release position. A powered actuator is energizable to move the pawl from the ratchet holding position to the ratchet releasing position, wherein a multistage reduction mechanism operably connects an output of the powered actuator to the pawl to provide a first release torque on pawl during normal use and a greater second release torque on pawl during emergency use.

12 Claims, 21 Drawing Sheets

(56) References Cited

U.S. PATENT DOCUMENTS

| | | | | |
|---|---|---|---|---|
| 7,287,785 | B2 | 10/2007 | Schupp et al. | |
| 8,764,075 | B2 | 7/2014 | Taurasi et al. | |
| 10,329,807 | B2 | 6/2019 | Margheritti et al. | |
| 10,655,368 | B2 | 5/2020 | Frello et al. | |
| 11,035,157 | B2 | 6/2021 | Cumbo | |
| 11,072,950 | B2 | 7/2021 | Taurasi | |
| 2002/0167177 | A1* | 11/2002 | Erices | E05B 85/02 292/201 |
| 2004/0113438 | A1* | 6/2004 | Kachouh | E05B 81/14 292/201 |
| 2004/0174021 | A1 | 9/2004 | Tensing et al. | |
| 2005/0200137 | A1 | 9/2005 | Nelsen et al. | |
| 2008/0224482 | A1* | 9/2008 | Cumbo | E05B 81/40 292/201 |
| 2017/0089103 | A1 | 3/2017 | Ottino et al. | |
| 2018/0171677 | A1* | 6/2018 | Im | E05B 83/18 |
| 2018/0179790 | A1* | 6/2018 | Jeong | E05B 83/36 |
| 2018/0340359 | A1* | 11/2018 | Cumbo | E05B 81/42 |
| 2019/0226246 | A1* | 7/2019 | Schiffer | E05B 81/14 |
| 2020/0340277 | A1 | 10/2020 | Robert | |
| 2021/0156175 | A1* | 5/2021 | Ishiguro | E05B 81/44 |

FOREIGN PATENT DOCUMENTS

| | | | | |
|---|---|---|---|---|
| DE | 10258391 | A1 * | 6/2004 | E05B 77/34 |
| WO | 2005047628 | A1 | 5/2005 | |
| WO | 2020232543 | A1 | 11/2020 | |

OTHER PUBLICATIONS

Machine generated English translation of CN 108868390 A. (Year: 2024).*

Espacenet, English machine translation of DE 19710531 A1, generated Jun. 25, 2024. (Year: 2024).*

Espacenet machine translation of DE 19710531 A1, generated Jun. 24, 2024. (Year: 2024).*

* cited by examiner

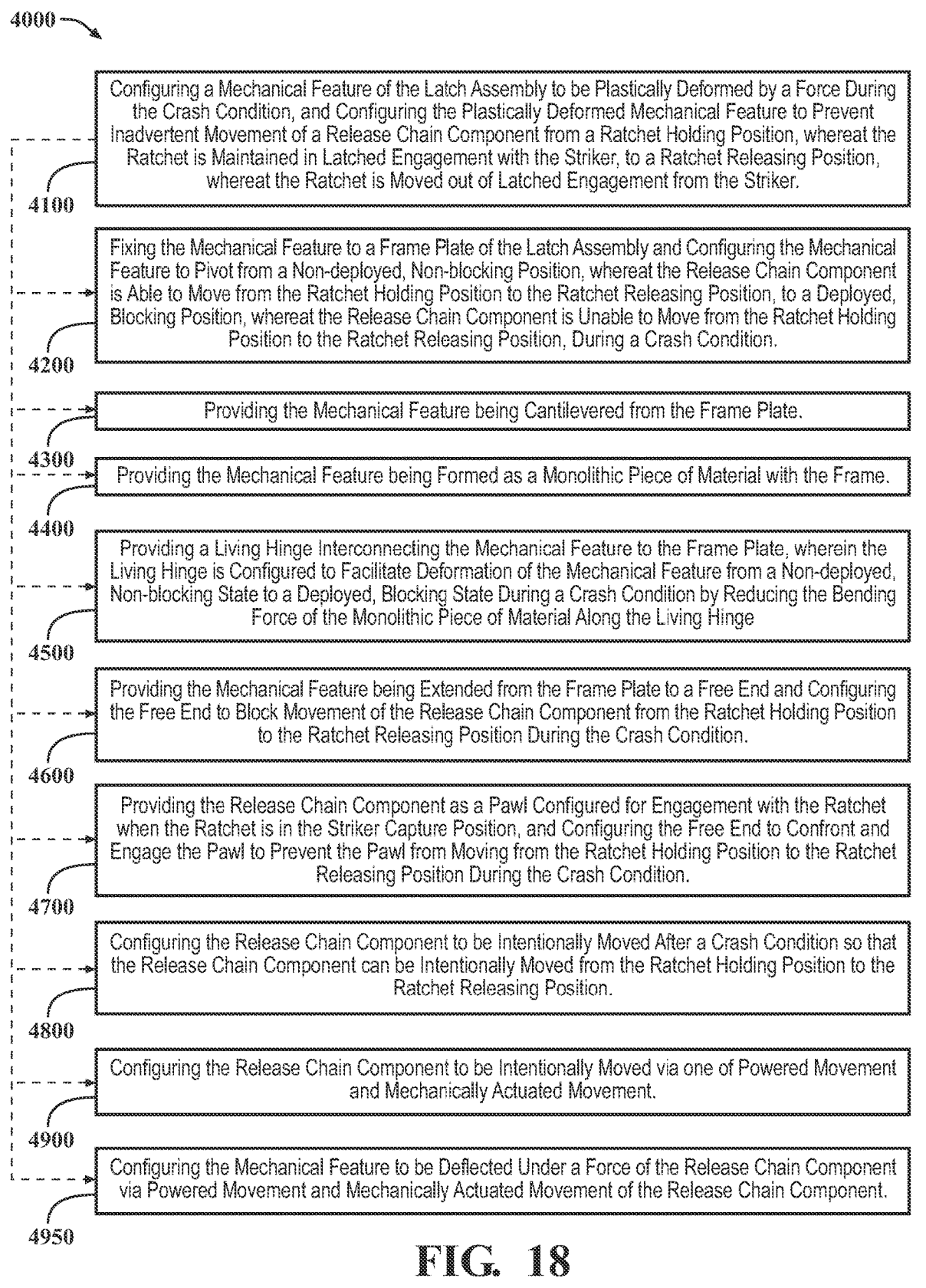

4000

4100 — Configuring a Mechanical Feature of the Latch Assembly to be Plastically Deformed by a Force During the Crash Condition, and Configuring the Plastically Deformed Mechanical Feature to Prevent Inadvertent Movement of a Release Chain Component from a Ratchet Holding Position, whereat the Ratchet is Maintained in Latched Engagement with the Striker, to a Ratchet Releasing Position, whereat the Ratchet is Moved out of Latched Engagement from the Striker.

4200 — Fixing the Mechanical Feature to a Frame Plate of the Latch Assembly and Configuring the Mechanical Feature to Pivot from a Non-deployed, Non-blocking Position, whereat the Release Chain Component is Able to Move from the Ratchet Holding Position to the Ratchet Releasing Position, to a Deployed, Blocking Position, whereat the Release Chain Component is Unable to Move from the Ratchet Holding Position to the Ratchet Releasing Position, During a Crash Condition.

4300 — Providing the Mechanical Feature being Cantilevered from the Frame Plate.

4400 — Providing the Mechanical Feature being Formed as a Monolithic Piece of Material with the Frame.

4500 — Providing a Living Hinge Interconnecting the Mechanical Feature to the Frame Plate, wherein the Living Hinge is Configured to Facilitate Deformation of the Mechanical Feature from a Non-deployed, Non-blocking State to a Deployed, Blocking State During a Crash Condition by Reducing the Bending Force of the Monolithic Piece of Material Along the Living Hinge 4600 — Providing the Mechanical Feature being Extended from the Frame Plate to a Free End and Configuring the Free End to Block Movement of the Release Chain Component from the Ratchet Holding Position to the Ratchet Releasing Position During the Crash Condition.

4700 — Providing the Release Chain Component as a Pawl Configured for Engagement with the Ratchet when the Ratchet is in the Striker Capture Position, and Configuring the Free End to Confront and Engage the Pawl to Prevent the Pawl from Moving from the Ratchet Holding Position to the Ratchet Releasing Position During the Crash Condition.

4800 — Configuring the Release Chain Component to be Intentionally Moved After a Crash Condition so that the Release Chain Component can be Intentionally Moved from the Ratchet Holding Position to the Ratchet Releasing Position.

4900 — Configuring the Release Chain Component to be Intentionally Moved via one of Powered Movement and Mechanically Actuated Movement.

4950 — Configuring the Mechanical Feature to be Deflected Under a Force of the Release Chain Component via Powered Movement and Mechanically Actuated Movement of the Release Chain Component.

FIG. 18

CLOSURE LATCH ASSEMBLY WITH POWER LATCH RELEASE MECHANISM HAVING DUAL DRIVE POWER RELEASE ACTUATOR AND MULTI-STAGE GEARSET

CROSS-REFERENCE TO RELATED APPLICATION

This application claims the benefit of U.S. Provisional Application Ser. No. 63/238,730, filed Aug. 30, 2021, and U.S. Provisional Application Ser. No. 63/219,808, filed Jul. 8, 2021, which are both incorporated herein by way of reference in their entirety.

FIELD

The present disclosure relates generally to automotive door latches, and more particularly, to a power door latch assembly equipped with a power release motor driving a multistage gear reduction to provide a normal output force and an increased output force of the power release motor.

BACKGROUND

This section provides background information related to automotive door latches and is not necessarily prior art to the concepts associated with the present disclosure.

A vehicle closure panel, such as a side door for a vehicle passenger compartment, is hinged to swing between open and closed positions and includes a latch assembly mounted to the door. The latch assembly functions in a well-known manner to latch the door when it is closed and unlatch and release the door to permit subsequent movement of the door to its open position. As is also well known, the latch assembly is configured to include a latch mechanism for latching the door and a release mechanism for unlatching the door. The release mechanism can be power-operated to unlatch the door.

During powered actuation of latch mechanism, it is known to actuate a gear mechanism to move a pawl from a ratchet holding position to a ratchet releasing position, thereby allowing a ratchet to move from a striker capture position to a striker releasing position, whereat the door can be moved from a closed position to an open position. In order to ensure the pawl is able to be moved from the ratchet holding position to the ratchet releasing position, the motor must be provided having a sufficient output force to overcome any friction build-up between the pawl and the ratchet. In some cases, high seal loads are present between the door and the vehicle body, such as in an accident scenario, for example. As such, it is known to incorporate a motor having an output force well in excess of that needed during normal use so as to be able to ensure the door can be opened in an increased seal load condition. The need to provide the motor having an increased output force well in excess of that needed during normal use, although generally suitable for its intended use, comes with an increased cost, increased size, and increased weight.

Thus, there remains a need to develop alternative arrangements for latch mechanisms for use in vehicular door latches which optimize the ability to move a pawl from a ratchet holding position to a ratchet releasing position under the power of a powered motor without having to provide the powered motor having a size in excess of that needed during normal use conditions. In addition, further advancements are desired to ensure features of the power actuated latch assemblies retain their intended position and functionality upon being impacted, such as in a crash condition.

SUMMARY

This section provides a general summary of the disclosure, and is not intended to be a comprehensive and exhaustive listing of all of its features or its full scope.

It is an object of the present disclosure to provide a power latch assembly for motor vehicle closure applications that overcomes at least those drawbacks discussed above associated with known power latch assemblies.

It is another object of the present disclosure to provide a power latch assembly for motor vehicle closure applications that has a motor that is optimized in size and output force.

It is another object of the present disclosure to provide a power latch assembly for motor vehicle closure applications that has a motor capable of moving a pawl from a ratchet holding position to a ratchet releasing position under a high seal load condition, including a seal load condition produced during an accident condition, with the motor being minimized in size and output force.

In accordance with the above objects, one aspect of the disclosure provides a power latch assembly for a vehicle door of a motor vehicle including a ratchet configured for movement between striker capture and striker release positions and being biased toward the striker release position. The power latch assembly includes a pawl configured for movement between a ratchet holding position whereat the pawl maintains the ratchet in the striker capture position and a ratchet releasing position whereat the pawl releases the ratchet to the striker release position. A powered actuator is energizable to move the pawl from the ratchet holding position to the ratchet releasing position, wherein a multi-stage reduction mechanism operably connects an output of the powered actuator to the pawl.

In accordance with another aspect of the disclosure, the multistage reduction mechanism has at least two power takeoffs, with each power takeoff being configured to apply a different torque output to the pawl.

According to another aspect of the present disclosure, one of the power takeoffs is provided by a first gear reduction and another of the power takeoffs is provided by a second gear reduction, wherein the first and second gear reductions are different from one another.

According to another aspect of the present disclosure, one of the power takeoffs is actuated by rotating the output of the power actuator in a first direction and the other of the power takeoffs is actuated by rotating the output of the power actuator in a second direction opposite the first direction.

According to another aspect of the present disclosure, the first gear reduction is employed by rotating an output of the power actuator in a first direction and the second gear reduction is employed by rotating the output of the power actuator in a second direction opposite the first direction.

According to another aspect of the present disclosure, a first power takeoff is utilized during normal use conditions of the motor vehicle and a second power takeoff is utilized during an increased seal load condition, such as in an accident condition of the motor vehicle, wherein the second power takeoff produces a higher output force on the pawl compared to the first power takeoff.

According to another aspect of the present disclosure, a transition between actuation of the first power takeoff and actuation of the second power takeoff can be signaled via a control unit configured in operable communication with a sensor, wherein the sensor is configured to detect an increased seal load condition.

According to another aspect of the present disclosure, the sensor can be configured to signal the control unit upon detecting an accident condition.

According to another aspect of the present disclosure, the sensor can be configured to detect when load between the pawl and the ratchet has been increased from a normal use load, wherein the sensor is configured in operable communication with the power release actuator, such as via ECU, to automatically reverse the direction of movement of the power release actuator after, thereby increasing the output force on the pawl to overcome the increased load between the pawl and the ratchet to move the pawl to the ratchet releasing position.

According to another aspect of the present disclosure, the first gear reduction includes a first number of gears and the second gear reduction includes a second number of gears, wherein the first number of gears is less than the second number of gears.

According to another aspect of the present disclosure, the first gear reduction includes a first stage gear having a first driven gear configured in meshed engagement with the output of the power release actuator and a first pinion gear fixed to the first driven gear, and a second stage gear having a second driven gear configured in meshed engagement with the first pinion gear.

According to another aspect of the present disclosure, the first pinion gear is coaxial with a rotational axis of the first driven gear.

According to another aspect of the present disclosure, a first drive member can be fixed to the second driven gear, with the first drive member being configured in operable driving communication with the pawl to move the pawl from the ratchet holding position to the ratchet releasing position.

According to another aspect of the present disclosure, a pawl release link can be coupled to the pawl and biased into engagement with the first drive member, with the pawl release link being configured to move the pawl from the ratchet holding position to the ratchet releasing position in response to movement of the second driven gear in a first direction and to return the pawl to the ratchet holding position in response to movement of the second driven gear in a second direction opposite the first direction.

According to another aspect of the present disclosure, the pawl release link can be provided having a slot and a pin extending from the pawl can be received in the slot for lost motion movement of the pin in the slot.

According to another aspect of the present disclosure, the second gear reduction includes the first driven gear configured in meshed engagement with the output of the power release actuator and the second driven gear configured in meshed engagement with the first pinion gear, and further includes a second pinion gear fixed to the second driven gear and a third driven gear configured in meshed engagement with the second pinion gear.

According to another aspect of the present disclosure, the second pinion gear is coaxial with a rotational axis of the second driven gear.

According to another aspect of the present disclosure, a second drive member is fixed to the third driven gear, the second drive member being configured in operable driving communication with the pawl to move the pawl from the ratchet holding position to the ratchet releasing position.

According to another aspect of the present disclosure, the second drive member is configured for direct engagement with the pawl.

According to another aspect of the present disclosure, the first drive member extends from a first side of the second driven gear and the second pinion extends from a second side of the second driven gear opposite the first side.

According to another aspect of the present disclosure, the first gear reduction causes the pawl to move from the ratchet holding position to the ratchet releasing position in X seconds in response to actuating the power actuator in the first direction and the second gear reduction causes the pawl to move from the ratchet holding position to the ratchet releasing position in X+Y seconds in response to actuating the power actuator in the second direction, wherein X seconds is less that X+Y seconds.

According to another aspect of the present disclosure, a method of increasing the output torque of a latch power release actuator of a power latch assembly from a first output torque to an increased second output torque is provided. The method includes configuring the power release actuator to rotate an output in a first direction to drive a first power takeoff in a first direction to generate the first output torque, and configuring the power release actuator to rotate the output in a second direction to drive a second power takeoff in a second direction opposite the first direction to generate the second output torque.

According to another aspect of the present disclosure, the method further includes configuring the first power takeoff having a first gear reduction and configuring the second power takeoff having a second gear reduction.

According to another aspect of the present disclosure, the method can further include providing the first gear reduction having a first driven gear configured in meshed engagement with the output of the power release actuator and a first pinion gear fixed to the first driven gear, and a second driven gear configured in meshed engagement with the first pinion gear.

According to another aspect of the present disclosure, the method can further include configuring the second gear reduction having the first driven gear arranged in meshed engagement with the output of the power release actuator and the second driven gear arranged in meshed engagement with the first pinion gear, and a second pinion gear fixed to the second driven gear and a third driven gear arranged in meshed engagement with the second pinion gear.

According to another aspect of the present disclosure, the method can further include configuring the second driven gear for operable driving engagement with a pawl of the power latch assembly to move the pawl from a ratchet holding position to a ratchet releasing position upon movement of the first power takeoff in the first direction, and configuring the third driven gear for operable driving engagement with the pawl of the power latch assembly to move the pawl from the ratchet holding position to the ratchet releasing position upon movement of the second power takeoff in the second direction.

According to another aspect of the present disclosure, the method can further include configuring the second driven gear in operable driving engagement with a pawl via a pawl release link and configuring the pawl release link to move the pawl from a ratchet holding position to a ratchet releasing position upon movement of the first power takeoff in the first direction.

According to another aspect of the present disclosure, the method can further include configuring the pawl to move in a lost-motion connection with the pawl release link upon movement of the second power takeoff in the second direction.

According to another aspect of the present disclosure, the method can further include configuring an electronic control unit (ECU) in operable communication with the power release actuator and configuring the ECU to signal the power release actuator to change the direction of rotation of the output of the power release actuator from the first direction to the second direction when increased torque is needed to move the pawl from the ratchet holding position to the ratchet releasing direction.

According to another aspect of the present disclosure, the method can further include configuring the power release actuator to change the direction of rotation of the output of the power release actuator from the first direction to the second direction automatically when the torque applied to the pawl while the output of the power release actuator is moving in the first direction is insufficient to move the pawl from the ratchet holding position to the ratchet releasing direction.

According to another aspect of the present disclosure, a method of releasing a power latch assembly of a closure panel of a motor vehicle is provided. The method includes: detecting a command to power release the power latch assembly; operating a motor of the power latch assembly in a first mode; detecting whether the power latch assembly has been released; stopping the motor if the detecting indicates the power latch assembly has been released; operating the motor of the power latch assembly in a second mode if the detecting indicates the power latch assembly has not been released; detecting whether the power latch assembly has been released; and stopping the motor if the detecting indicates the power latch assembly has been released.

According to another aspect of the present disclosure, the method can further include providing the first mode to include rotating an output of the motor in a first direction and providing the second mode to include rotating an output of the motor in a second direction opposite the first direction.

It is another aspect of the present disclosure to provide a latch assembly for selectively unlatching a vehicle closure panel for desired movement of the closure panel from a closed position to an open or deployed positions relative to a vehicle body when desired and for retaining the closure panel in a closed position relative to the vehicle body when desired.

It is a further aspect of the present disclosure to provide a latch assembly for retaining the closure panel in a closed position relative to the vehicle body upon the power latch assembly experiencing an impact force during a crash condition and prior to the power latch assembly having been intentionally signaled to move to an unlatched state.

In accordance with these and other aspects, a latch assembly for a motor vehicle having a vehicle body defining a door opening and a vehicle swing door pivotably connected to the vehicle body for swing movement along a swing path between open and closed positions relative to the door opening is provided. The power latch assembly of the present disclosure includes a release chain component configured for release from a ratchet holding position whereat a ratchet is maintained in latched engagement with a striker to maintain the swing door in the closed position to a ratchet releasing position whereat the ratchet is moved out of latched engagement from the striker to allow the swing door to be moved from the closed position to the open position. The latch assembly includes a mechanical feature that prevents inadvertent movement of the release chain component from the ratchet holding position to the ratchet releasing position upon the latch assembly having been impacted in a crash condition without first having been intentionally actuated to move to the ratchet releasing position.

In accordance with another aspect, the release chain component is a pawl.

In accordance with another aspect, the mechanical feature directly confronts the pawl upon being forcibly impacted in a crash condition to block the pawl from moving from a ratchet holding position to a ratchet releasing position.

In accordance with another aspect, the mechanical feature is fixed to a frame plate of the latch assembly.

In accordance with another aspect, the mechanical feature is formed as a monolithic piece of material with the frame plate.

In accordance with another aspect, the mechanical feature is cantilevered from the frame plate.

In accordance with another aspect, a living hinge interconnects the mechanical feature to the frame plate, wherein the living hinge facilitates deformation of the mechanical feature from a non-deployed, non-blocking state to a deployed, blocking state during a crash condition.

In accordance with another aspect, the latch assembly of the motor vehicle is a power latch assembly and has a frame plate supporting an electric motor arranged to drive a worm gear configured in meshed engagement with a power release gear, such that rotation of the power release gear via the selective rotation of the worm gear causes the pawl to move between a ratchet holding position and a ratchet releasing position. The power latch assembly further includes a ratchet operably coupled to the frame plate for movement between a striker capture position to retain the vehicle swing door in the closed position and a striker release position to allow the vehicle swing door to be moved to the open position. A release chain component is operably coupled to the frame plate and configured for release from a ratchet holding position, whereat the ratchet is maintained in latched engagement with a striker in the striker capture position to maintain the vehicle swing door in the closed position, to the ratchet releasing position, whereat the ratchet is moved out of latched engagement from the striker to allow the vehicle swing door to be moved from the closed position to the open position; and a mechanical feature operably coupled to the frame plate to be influenced by a force in a crash condition of the motor vehicle, the mechanical feature being configured to prevent inadvertent movement of the release chain component from the ratchet holding position to the ratchet releasing position. Accordingly, the swing door is maintained in its closed position via interaction of pawl with ratchet until desired to be intentionally move the swing door to its open position.

In accordance with a further aspect, a method of preventing a ratchet of a latch assembly of a motor vehicle swing door from inadvertently moving from a striker capture position, whereat the ratchet is maintained in latched engagement with a striker to maintain the motor vehicle swing door in a closed position, to a striker release position, whereat the ratchet is moved out of latched engagement from the striker to allow the swing door to be moved from the closed position to the open position, during a crash condition of a motor vehicle is provided. The method includes: configuring a mechanical feature of the latch assembly to be plastically deformed by an impact force during the crash condition, and configuring the plastically deformed mechanical feature to prevent inadvertent movement of a release chain component from a ratchet holding position, whereat the ratchet is maintained in latched engagement with the striker, to a ratchet releasing position, whereat the ratchet is moved out of latched engagement from the striker.

In accordance with a further aspect, the method can further include fixing the mechanical feature to a frame plate of the latch assembly and configuring the mechanical feature to pivot from a non-deployed, non-blocking position, whereat the release chain component is able to move from the ratchet holding position to the ratchet releasing position, to a deployed, blocking position, whereat the release chain component is unable to move from the ratchet holding position to the ratchet releasing position, during a crash condition.

In accordance with a further aspect, the method can further include providing the mechanical feature being cantilevered from the frame plate.

In accordance with yet a further aspect, the method can further include providing the mechanical feature being formed as a monolithic piece of material with the frame plate.

In accordance with yet a further aspect, the method can further include providing a living hinge interconnecting the mechanical feature to the frame plate, and configuring the living hinge to facilitate deformation of the mechanical feature from a non-deployed, non-blocking state to a deployed, blocking state during a crash condition by reducing the bending force of the monolithic piece of material along the living hinge.

In accordance with yet another aspect, the method can further include providing the mechanical feature being extended from the frame plate to a free end and configuring the free end to block movement of the release chain component from the ratchet holding position to the ratchet releasing position during the crash condition.

In accordance with yet another aspect, the method can further include providing the release chain component as a pawl configured for engagement with the ratchet when the ratchet is in the striker capture position, and configuring the free end to confront and engage the pawl to prevent the pawl from moving from the ratchet holding position to the ratchet releasing position during the crash condition.

In accordance with yet another aspect, the method can further include configuring the release chain component to be intentionally moved after a crash condition so that the release chain component can be intentionally moved from the ratchet holding position to the ratchet releasing position.

In accordance with yet another aspect, the method can further include configuring the release chain component to be intentionally moved via one of powered movement and mechanically actuated movement.

In accordance with yet another aspect, the method can further include configuring the mechanical feature to be deflected under a force of the release chain component via one of powered movement and mechanically actuated movement of the release chain component.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

These and other aspects, features, and advantages of the present disclosure will be readily appreciated, as the same becomes better understood by reference to the following detailed description when considered in connection with the accompanying drawings wherein:

FIG. 18 illustrates a flow chart of a method of preventing a ratchet of a latch assembly of a motor vehicle swing door from inadvertently moving from a striker capture position during a crash condition, in accordance with an illustrative embodiment.

Corresponding reference numerals are used throughout all of the drawings to indicate corresponding parts.

DETAILED DESCRIPTION OF EXAMPLE EMBODIMENTS

Figure 1:
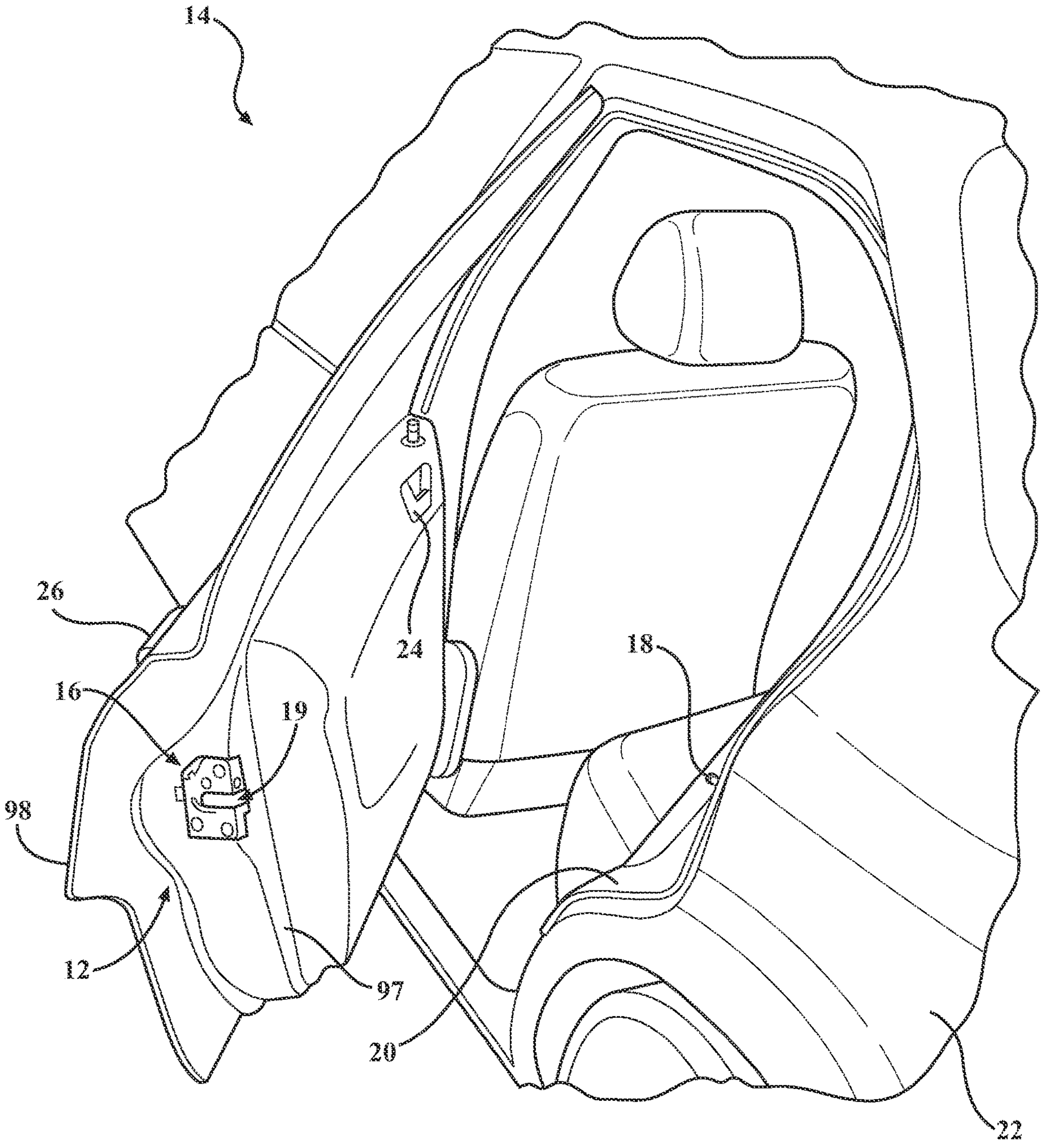
FIG. 1 is a partial perspective view of a motor vehicle having a side door equipped with a power latch assembly embodying the teachings of the present disclosure.

One or more example embodiments of a latch assembly of the type well-suited for use in motor vehicle closure systems will now be described with reference to the accompany drawings. However, these example embodiments are only provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail, as they will be readily understood by a skilled artisan.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom", and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

Figure 2:
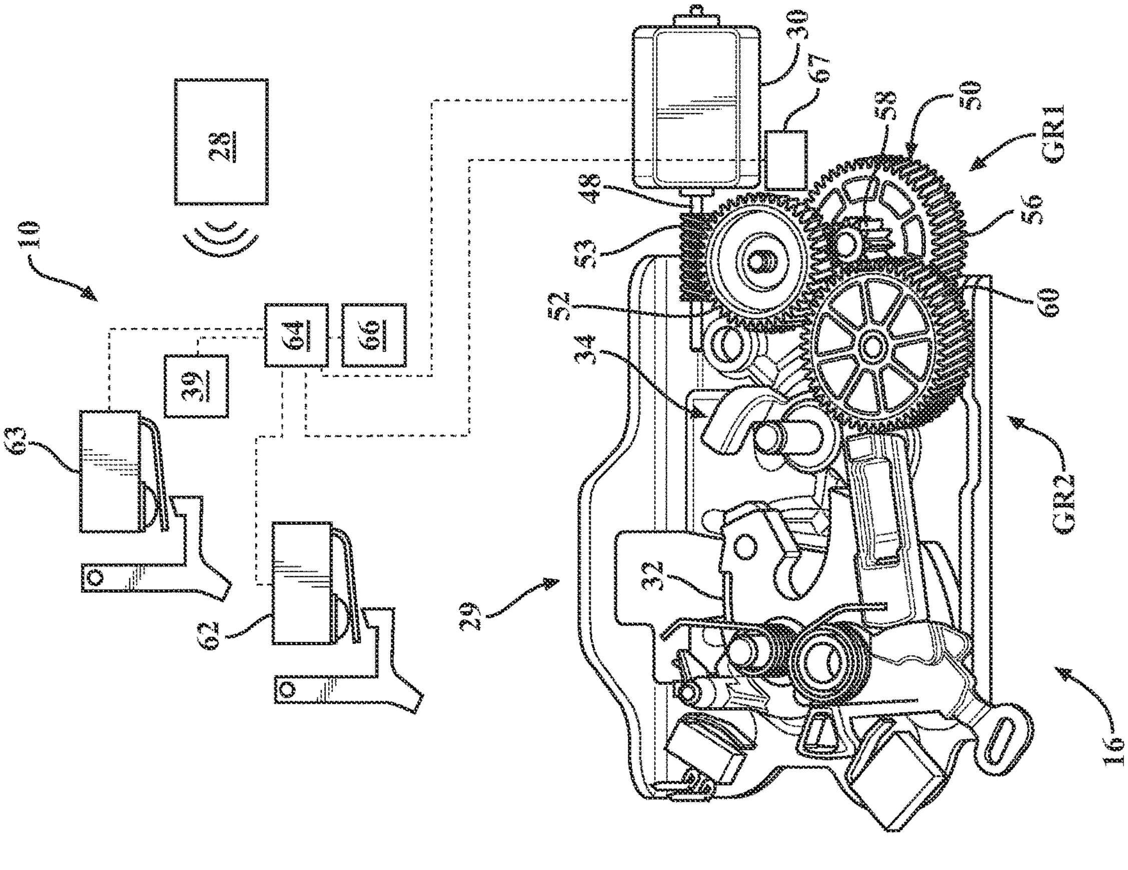
FIG. 2 is a front side view of a power latch assembly embodying the teachings of the present disclosure shown schematically in operable communication with various components of the side door, with some components removed for clarity purposes only.
Figure 2A:
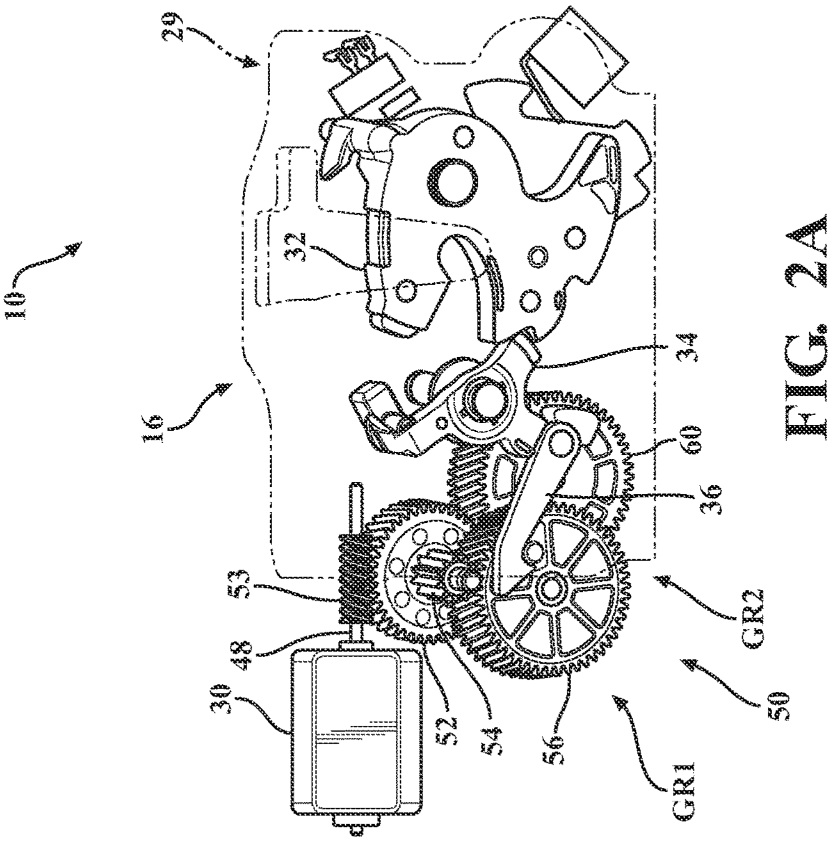
FIG. 2A is a rear side view of the power latch assembly of FIG. 2 with a latch plate shown in transparency for clarity reasons only.
Figure 3A:
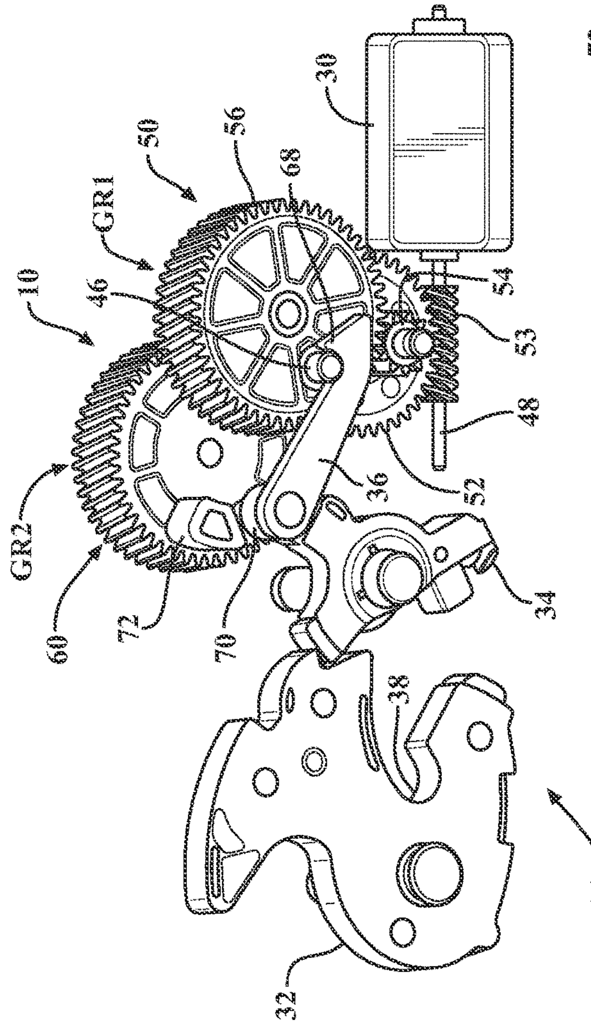
FIG. 3A is a top perspective view of a power actuator and latch components of the power latch assembly embodying the teachings of the present disclosure with a pawl of the power latch assembly shown in a ratchet holding position with a ratchet of the power latch assembly.
Figure 3B:
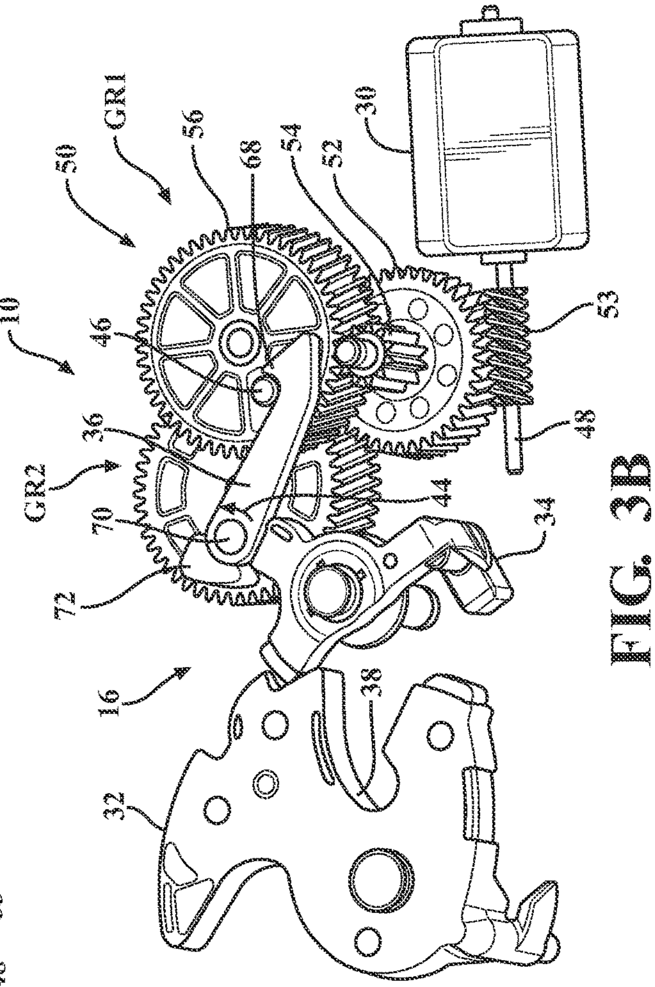
FIG. 3B is a bottom perspective view of the power actuator and latch components of the power latch assembly of FIG. 3A.

Referring initially to FIG. 1, a non-limiting example of a power latch assembly is shown, referred to hereafter simply as latch assembly 10, installed in a closure panel, such as, by way of example and without limitation, a door, shown as a passenger side swing door 12 of a motor vehicle 14. Latch assembly 10 includes a latch mechanism 16 configured to releasably latch and hold a striker 18 mounted to a sill portion 20 of a vehicle body 22 when swing door 12 is closed. Latch assembly 10 can be selectively actuated via an inside door handle 24, an outside door handle 26, and a key fob 28 (FIG. 2). As will be detailed, latch assembly 10 is configured to be power-operated via selective actuation of a power release actuator, such as an electric motor 30. For reasons discussed hereafter, power release actuator 30 is able to be minimized in size, weight and power output, thereby enhancing the flexibility of design of the closure panel, while also reducing the cost associated therewith. Further yet, as discussed in further detail below, the power release actuator 30 is assured of having sufficient power to move latch mechanism 16 from a latched state to an unlatched state, even if friction forces within latch mechanism are suddenly increased, such as may result in a crash condition, thereby allowing closure panel 12 to be moved from a closed position to an open position.

Referring to FIG. 2, shown is a non-limiting embodiment of latch assembly 10 and latch mechanism 16 contained in a housing, shown in part via a latch frame plate 29, with some components removed for clarity purposes. Latch mechanism 16 includes a ratchet 32 and a pawl 34, and a release lever, also referred to as release link, pawl release lever, or pawl release link 36. Ratchet 32 is movable between a striker capture position, whereat ratchet 32 retains striker 18 with a striker slot 38 of ratchet 32 and swing door 12 in closed position, and a striker release position, whereat ratchet 32 permits release of striker 18 from a fishmouth 19 provided by latch housing of latch assembly 10 to allow movement of swing door 12 to the open position. A ratchet biasing member 40 (FIG. 4A), such as a spring, is provided to normally bias ratchet 32 toward its striker release position. Pawl 34 is movable between a ratchet holding position, whereat pawl 34 holds ratchet 32 in its striker capture position, and a ratchet releasing position whereat pawl 34 permits ratchet 32 to move to its striker release position. A pawl biasing member 42, such as a suitable spring, is provided to normally bias pawl 34 toward its ratchet holding position.

Pawl release link 36 is operatively (directly or indirectly via another component, such as an intermediate or secondary pawl release lever, and shown as directly, by way of example and without limitation) coupled, also referred to as connected, to pawl 34 and is movable between a deployed position, also referred to as pawl release position, whereat pawl release link 36 moves pawl 34 against the bias of pawl biasing member 42 to its ratchet releasing position (FIG. 5), and a non-deployed position, also referred to as home position (FIGS. 3A-4C and 6), whereat pawl release link 36 permits pawl 34 to be in its ratchet holding position. A release link biasing member 44 (FIG. 4A), such as a suitable spring, can be provided to normally bias pawl release link 36 into engagement with a drive member, also referred to as first drive member 46.

Pawl release link 36 can be moved to its pawl release position via selective actuation of power release actuator 30. Power release actuator 30 has an output, shown as being provided by an output member, also referred to as output shaft 48, which is operably connected or coupled to pawl 34 via a multistage reduction mechanism 50. Multistage reduction mechanism 50, when driven by power release actuator 30, is configured to move pawl release link 36 to its pawl release position, whereat pawl 34 is moved to its ratchet releasing position.

Pawl release link 36, under normal use conditions (pawl 34 and ratchet 32 are configured as manufactured and have retained an "as manufactured" force of friction therebetween), is moved to its pawl release position via a first power takeoff of multistage reduction mechanism 50. First power takeoff is provided by a first gear reduction GR1 including a first number of gears, shown, by way of example and without limitation, as including a first driven gear 52 configured in meshed engagement with an output gear, also referred to a main drive gear or drive gear 53, wherein drive gear 53 is shown as a worm gear mounted on output shaft 48 and fixed for conjoint rotation with the output shaft 48 of power release actuator 30, and a first pinion gear 54 fixed to the first driven gear 52, shown as being fixed concentrically therewith for rotation about a common first axis A1 (FIG. 4A), and a second stage gear having a second driven gear 56 configured in meshed engagement with the first pinion gear 52. The first drive member 46 is shown fixed to second driven gear 56 for conjoint movement therewith, with first drive member 46 shown being fixed between an outer periphery and a second axis A2 about which second driven gear 56 rotates.

Pawl 34, under an emergency use condition (pawl 34 and ratchet 32 are have an unusually high, increased amount of friction therebetween as compared to the normal use condition), is moved to its pawl release position via a second power takeoff of multistage reduction mechanism 50, wherein the second power takeoff is different from the first power takeoff. Second power takeoff is provided by a second gear reduction GR2 including a second number of gears, wherein the second number of gears of the second power takeoff is different from the first number of gears of the first power takeoff. The second gear reduction GR2 is shown, by way of example and without limitation, as including the first driven gear 52 configured in meshed engagement the drive gear 53 and the second driven gear 56 configured in meshed engagement with the first pinion gear 52, and further including a second pinion gear 58 fixed to the second driven gear 56, shown as being fixed concentrically therewith for rotation about the common second axis A2 (FIG. 4A), and a third driven gear 60 configured in meshed engagement with the second pinion gear 58.

When desired to move pawl 34 from the ratchet holding positon to the ratchet releasing position during normal use conditions, such as when a person approaches motor vehicle 14 with electronic key fob 28 (FIG. 2) and actuates the outside door handle 26, for example, sensing both the presence of key fob 28 and that outside door handle 26 has been actuated (e.g. via electronic communication between an electronic switch 62 (FIG. 2, wherein inside door handle 24 also is actuatable via an electronic switch 63) and a latch electronic control unit (ECU) shown at 64 that at least partially controls the operation of latch assembly 10). In turn, latch ECU 64 actuates power release motor 30 to cause the first gear reduction GR1 to become actuated by rotating the output shaft 48 of the power actuator 30 in a first direction to release the latch mechanism 16 and shift latch assembly 10 into an unlatched operating state so as to facilitate subsequent opening of vehicle swing door 12. Power release motor 30 can be alternatively activated as part of a proximity sensor based entry feature (radar based proximity detection for example), for example when a person approaches vehicle 14 with electronic key fob 28 (FIG. 2) and actuates a proximity sensor 66, such as a capacitive sensor, or other touch/touchless based sensor (based on a recognition of the proximity of an object, such as the touch/swipe/hover/gesture or a hand or finger), (e.g. via communication between the proximity sensor 66 and latch ECU 64 that at least partially controls the operation of latch assembly 10). In turn, if detecting a normal use condition, such as the presence of electronic key fob 28, by way of example and without limitation, latch ECU 64 actuates power release motor 30 to rotate the output shaft 48 in the first direction to release the latch mechanism 16 and shift latch assembly 10 into an unlatched operating state so as to facilitate subsequent opening of vehicle door 12, as discussed above.

Figure 4A:
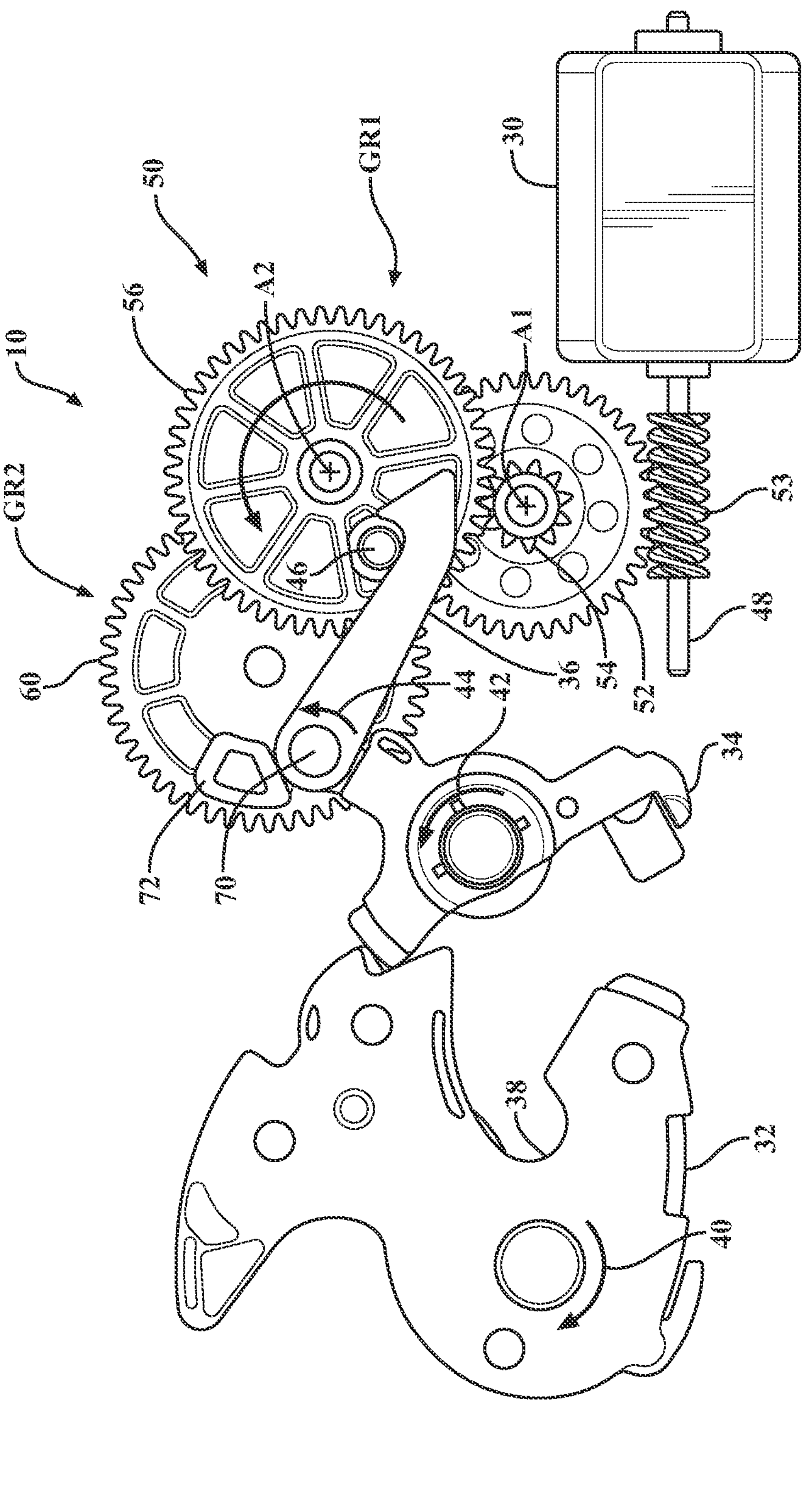
FIG. 4A is a side view of the power latch assembly of FIG. 3A shown during an initial stage of a normal release condition with the pawl shown in the ratchet holding position.
Figure 4C:
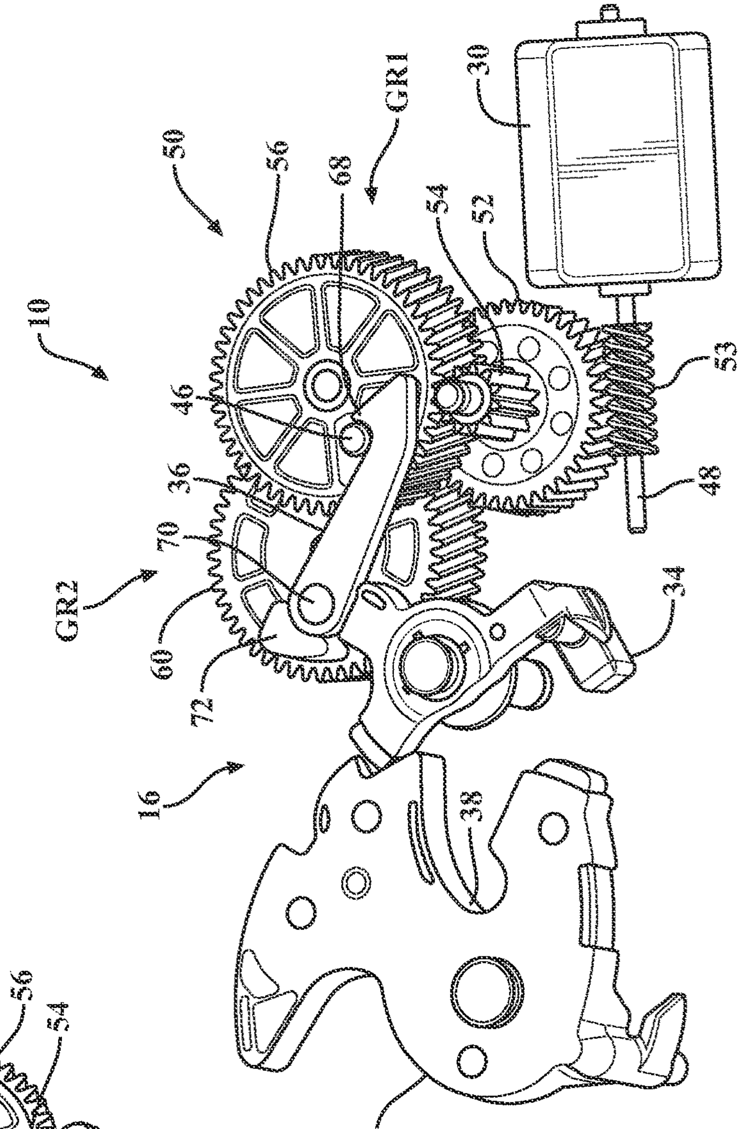
FIG. 4C is a view similar to FIG. 4A.
Figure 4B:
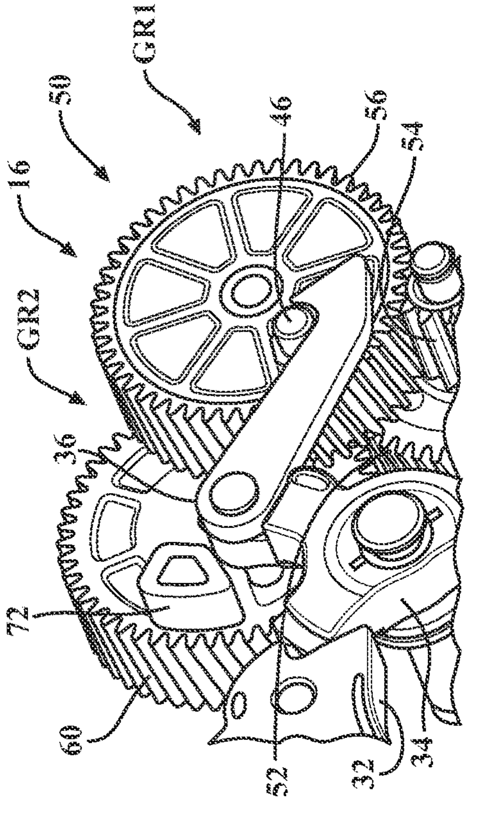
FIG. 4B is a fragmentary perspective view of the power latch assembly of FIG. 4A.
Figure 5:
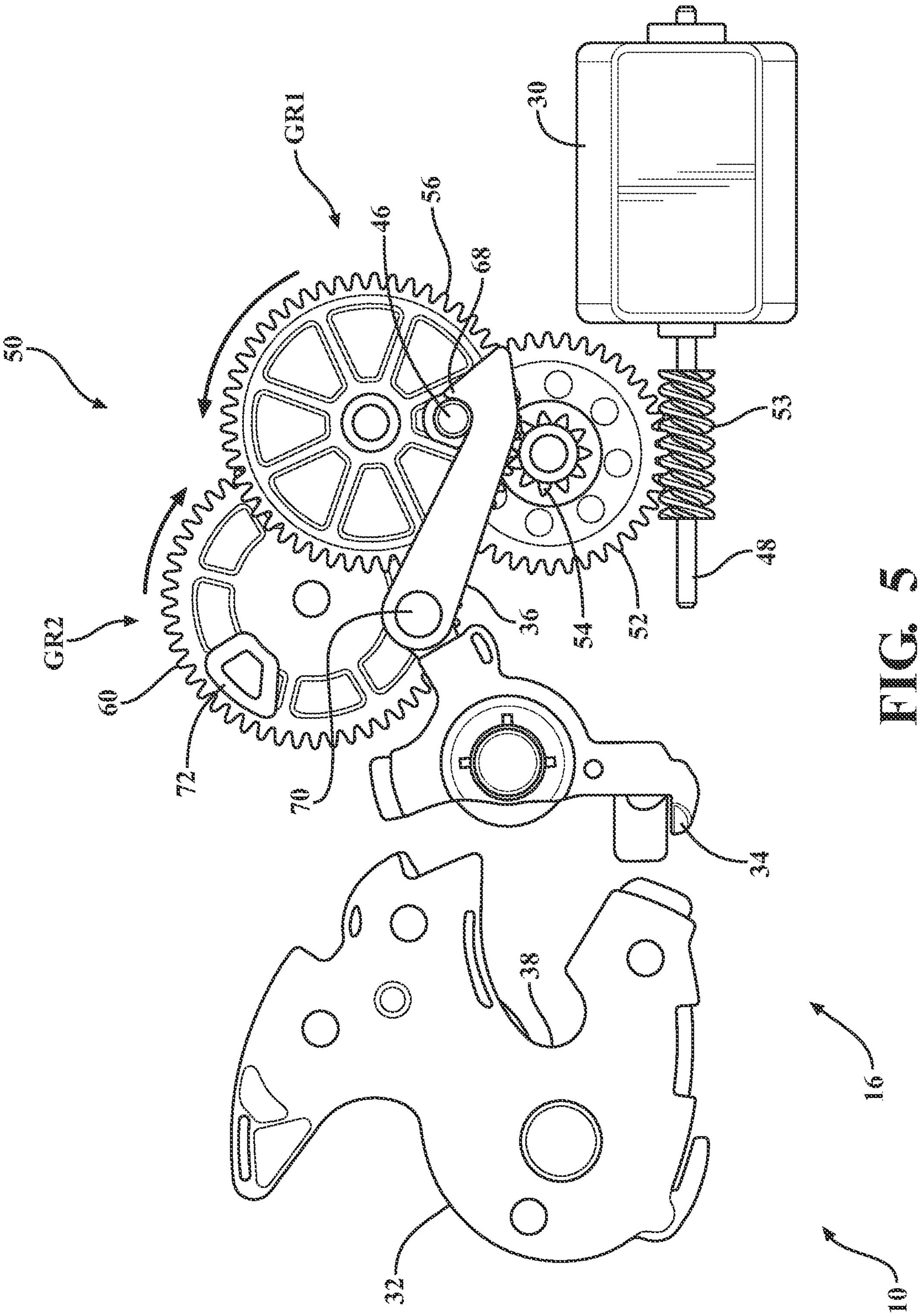
FIG. 5 is a view similar to FIG. 4A with the pawl shown in a ratchet release position during the normal release condition.

During normal operation, as output shaft 48 is rotated in the first direction, drive gear 53 causes first driven gear 52 to rotate in a clockwise direction, as viewed in FIG. 4A, whereupon first pinion gear 54 is driven conjointly in the clockwise direction, thereby causing second driven gear 56 to be driven in a normal release counterclockwise direction. As second driven gear 56 rotates in the normal release counterclockwise direction, first drive member 46, fixed to second driven gear 56, comes into engagement with pawl release link 36, shown as confronting and engaging a hook member 68 of pawl release link 66. In accordance with a non-limiting aspect of the disclosure, second driven gear 56 rotates few degrees, such as between about 1-10 degrees, by way of example and without limitation, prior to first drive member 46 coming into engagement with hook member 68. Accordingly, inertia of second driven gear 56 facilitates driving pawl release link 36 from the home position to the pawl release position, whereat pawl release link 36 moves pawl 34 against the bias of pawl biasing member 42 to its ratchet releasing position (FIG. 5), whereat ratchet 32 is free to move to the striker release position under the bias of ratchet biasing member 40.

Figure 6:
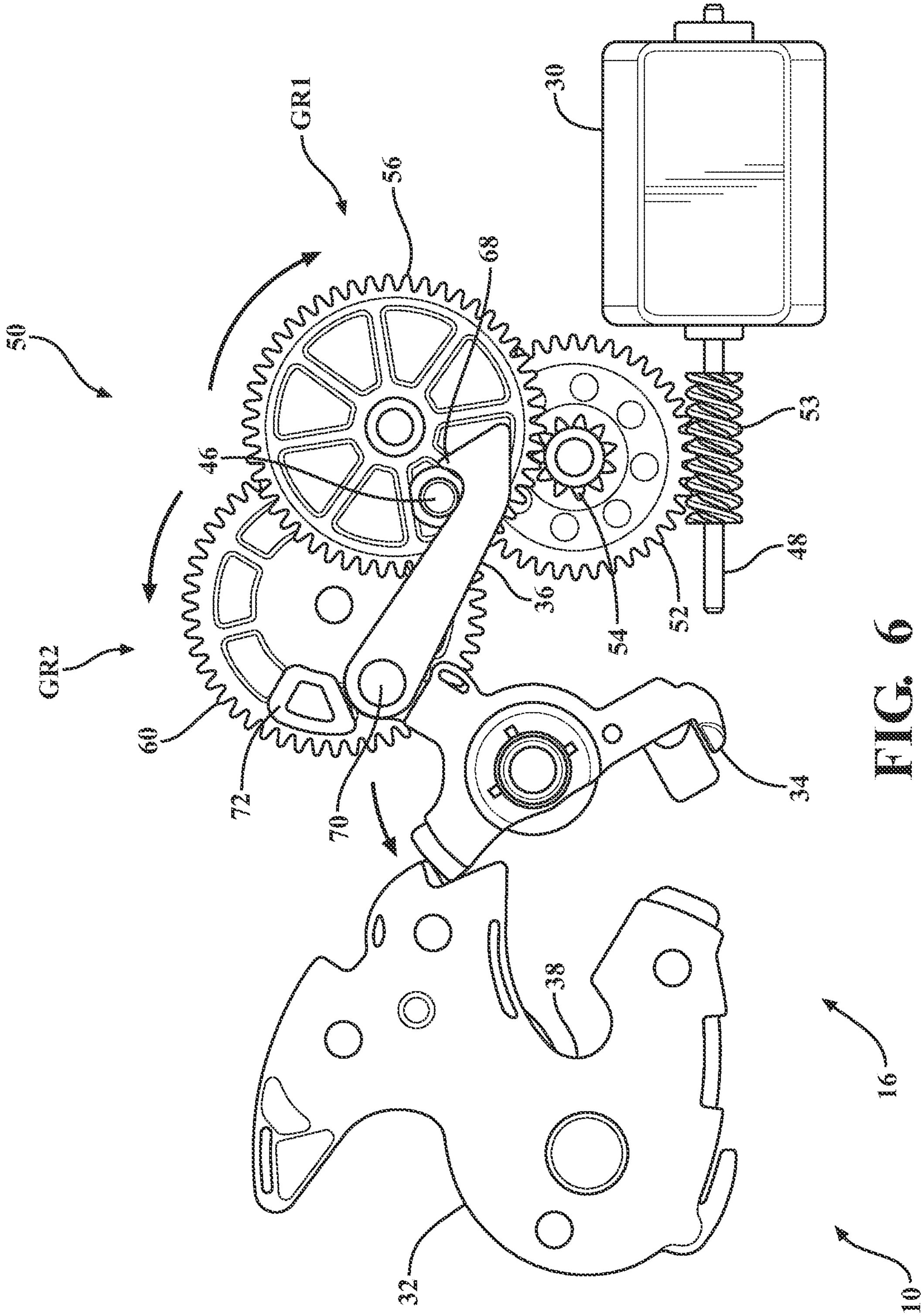
FIG. 6 is a view similar to FIG. 5 with the pawl shown returned to the ratchet capture position.

Then, upon release of power latch assembly 10, ECU 64, upon receiving a signal from a position sensor 67, which can be configured to detect the relative position of ratchet 32 and/or pawl 34, signals power release motor 30 to rotate in an opposite direction, thereby causing a reversal in motion of first gear reduction GR1 to ultimately cause second driven gear 56 to be rotated in a clockwise direction, as viewed in FIG. 6, whereupon pawl release link 36 is allowed to return to its home position, such as under the bias of pawl biasing member 42 returning pawl 34 to the ratchet holding position. Pawl release link 36 is coupled to pawl 34, such as via a pin 70, such that pawl release link moves conjointly with pawl 34 as it is biased by pawl biasing member 42 to the ratchet holding position.

Figure 7:
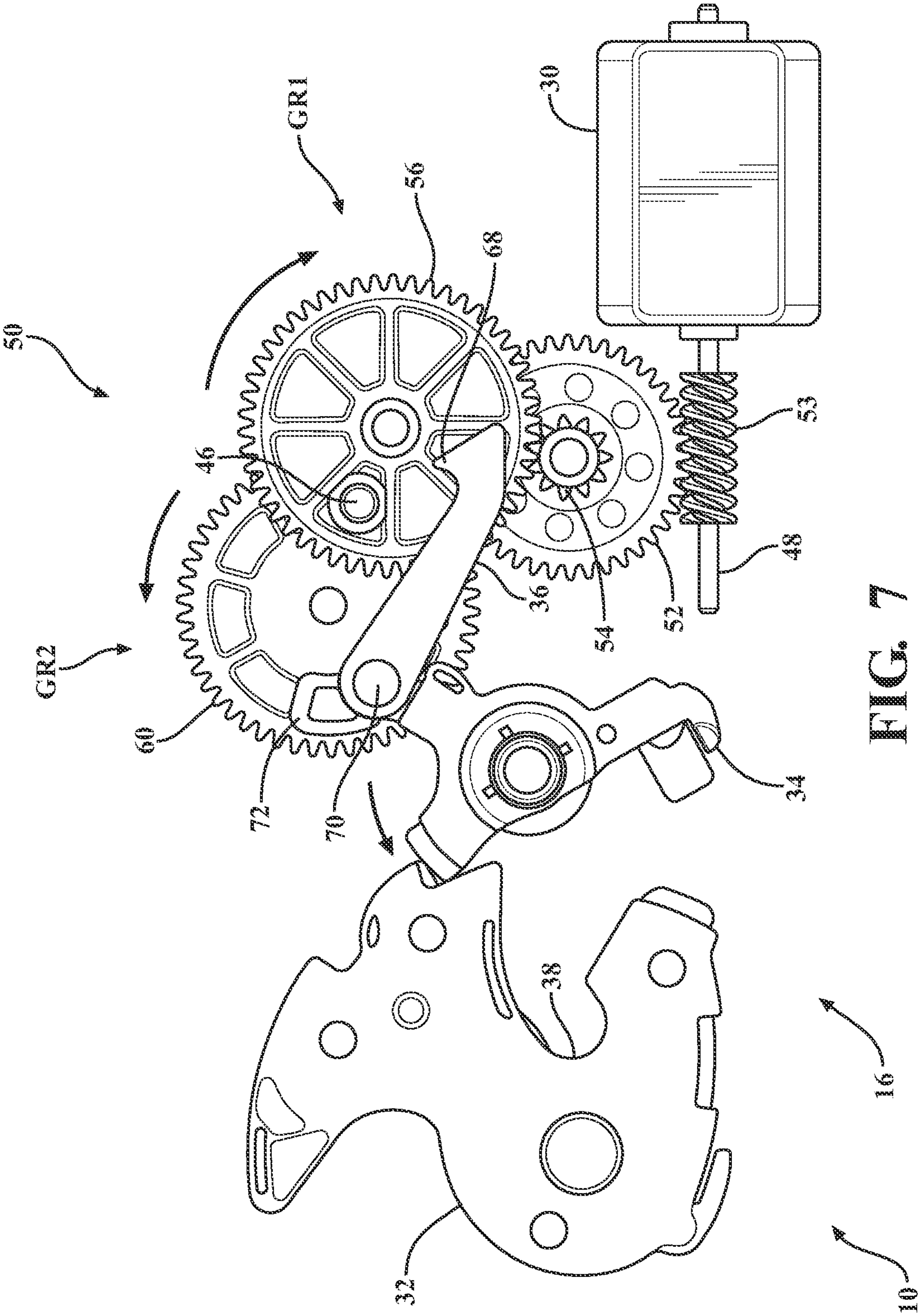
FIG. 7 is a front side view of the power latch assembly of FIG. 3A shown during an initial stage of an emergency release condition with the pawl shown in the ratchet holding position.
Figure 7A:
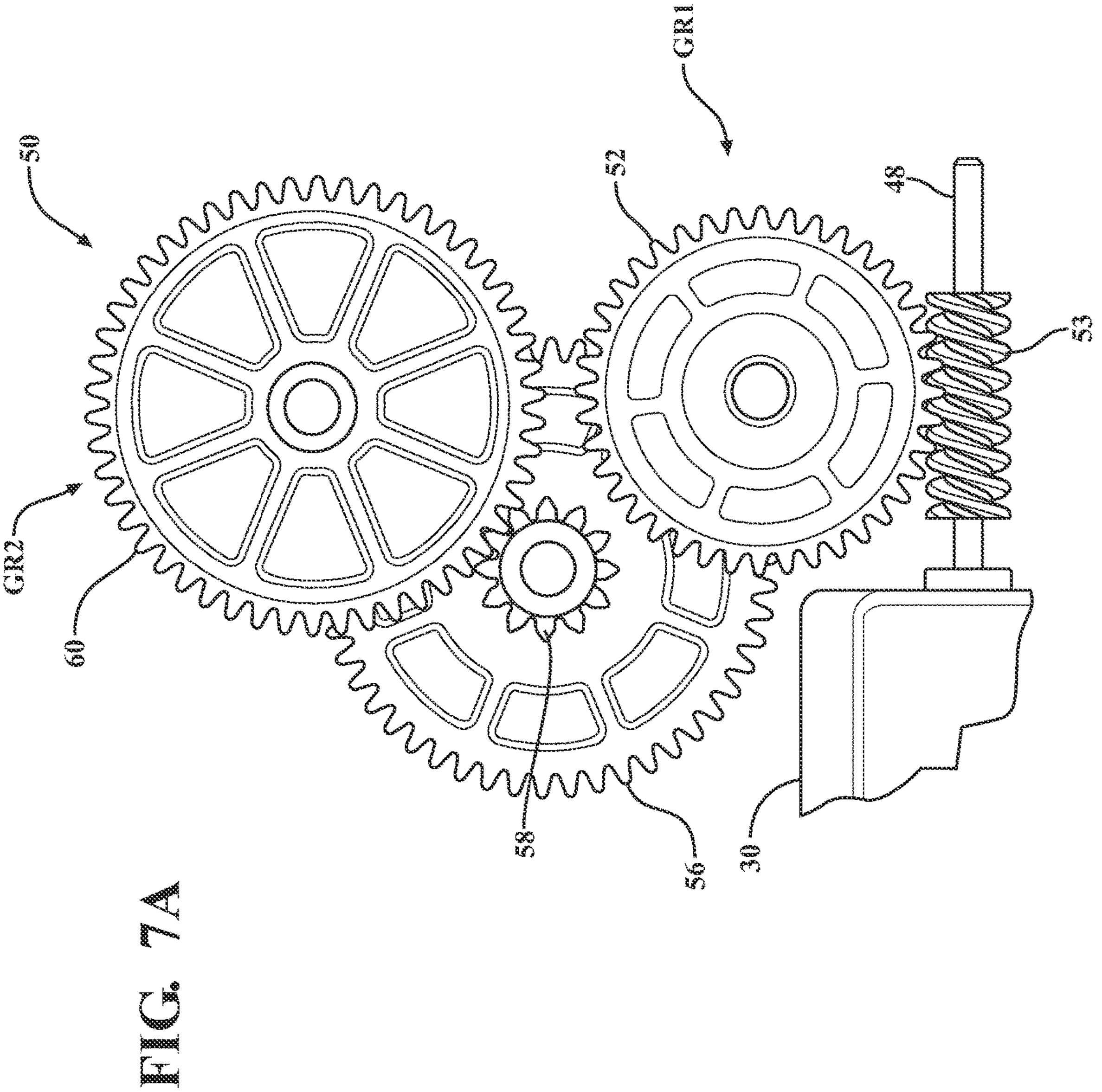
FIG. 7A is an enlarged fragmentary back side view of the power latch assembly of FIG. 7.
Figure 8:
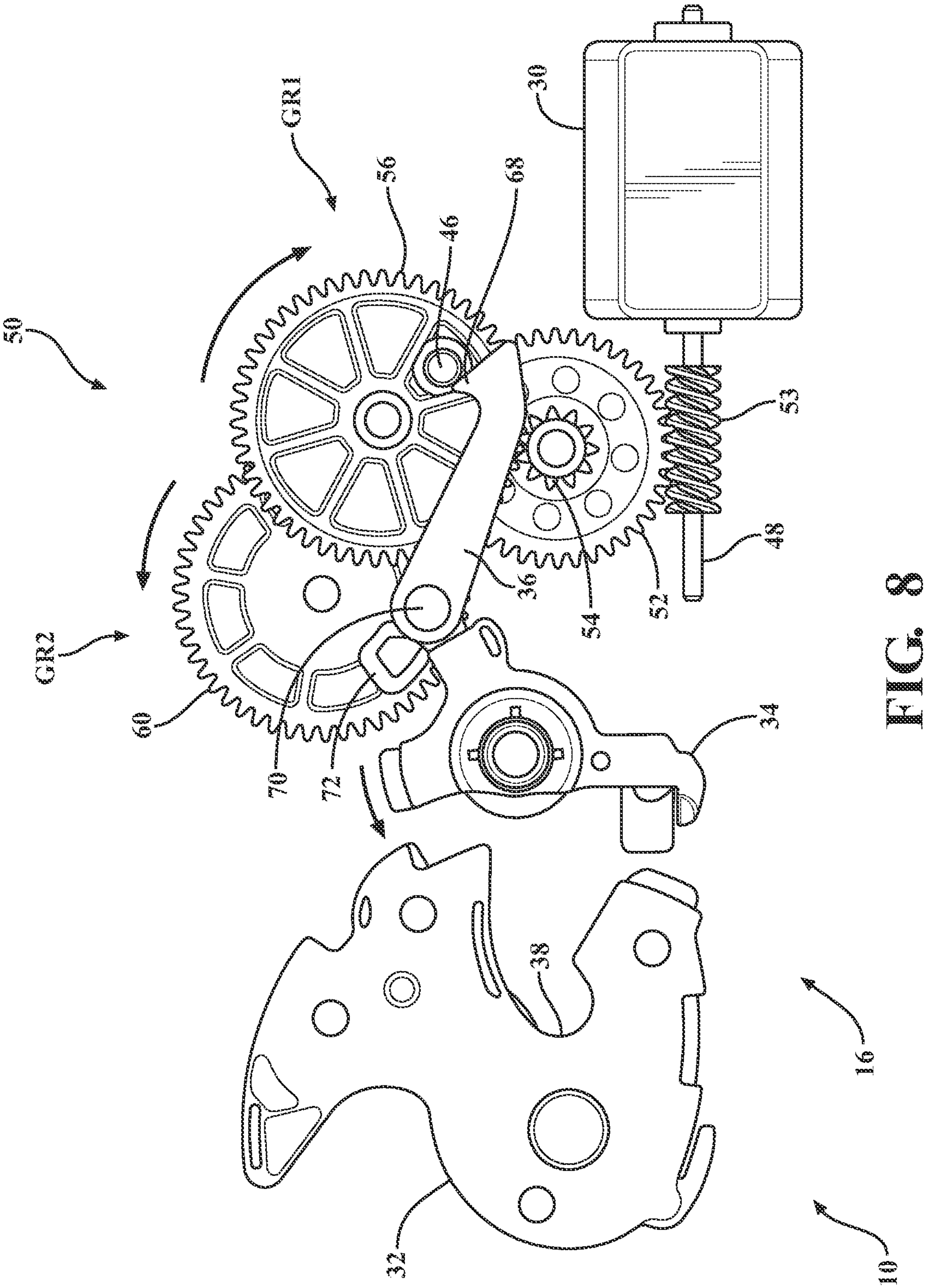
FIG. 8 is a view similar to FIG. 7 with the pawl shown in a ratchet release position during the emergency release condition.

During emergency operation, including any time normal operation fails to cause pawl 34 to be moved from its ratchet holding position to its ratchet releasing position, as can be detected by position sensor 67, ECU signals power release motor 30 to rotate output shaft 48 in the second direction, opposite the first direction of normal operation, thereby activating the second gear reduction GR2. As such, drive gear 53 causes first driven gear 52 to rotate in a counterclockwise direction, as viewed in FIG. 7, whereupon first pinion gear 54 is driven conjointly in the counterclockwise direction, thereby causing second driven gear 56 to be driven in an emergency release clockwise direction. As second driven gear 56 rotates in the emergency release clockwise direction, second pinion gear 58, fixed to second driven gear 56, drives third driven gear 60 in a counterclockwise direction, as viewed in FIG. 8, whereupon a second drive member 72, fixed to the third driven gear 60, is driven into operable driving communication with pawl 34 to move pawl 34 from the ratchet holding position to the ratchet releasing position. In accordance with one non-limiting aspect, second drive member 72 can be configured for direct engagement with pawl 34 or pin 70, thereby directly driving pawl 34 to the ratchet release position (FIG. 8). It will be appreciated by one possessing ordinary skill in the art that the second gear reduction GR2 activated in the emergency use condition imparts a greater torque, referred to as second torque, on pawl 34 in comparison to a first torque produced by the first gear reduction GR1 activated during the normal use condition. The relative differences between the first torque and the second torque can be adjusted as desired via providing the desire number of gear teeth on the gears of first and second gear reductions GR1, GR2. In a non-limiting example, drive gear 53 has 2 teeth and the first driven gear 52 has 40 teeth, resulting in a torque multiplier of 40/2=20; first pinion gear 54 has 11 teeth and second driven gear 56 has 50 teeth, resulting in a torque multiplier of 50/11=4.54, and thus, first gear reduction GR1 produces a total torque multiplier of 20×4.54=90.8 during normal use. In contrast, an additional torque multiplication is provided in emergency use by second gear reduction GR2, with second pinion gear 58, shown as having 12 teeth and third driven gear 60 having 50 teeth, resulting in an additional torque multiplier of 50/12=4.17. As such, second gear reduction GR2 produces a total torque multiplier of 20×4.54×4.17=378.6 during emergency use.

Under normal use condition, the first gear reduction GR1 causes the pawl 34 to move from the ratchet holding position to the ratchet releasing position in X seconds upon, in response to and immediately after actuating the power actuator in the first direction at a first rate of rotation, and under emergency operation, the second gear reduction GR2 causes the pawl 34 to move from the ratchet holding position to the ratchet releasing position in X+Y seconds upon, in response to and immediately after actuating the power actuator in the second direction at the first rate of rotation, wherein X seconds is less that X+Y seconds.

Figure 9:
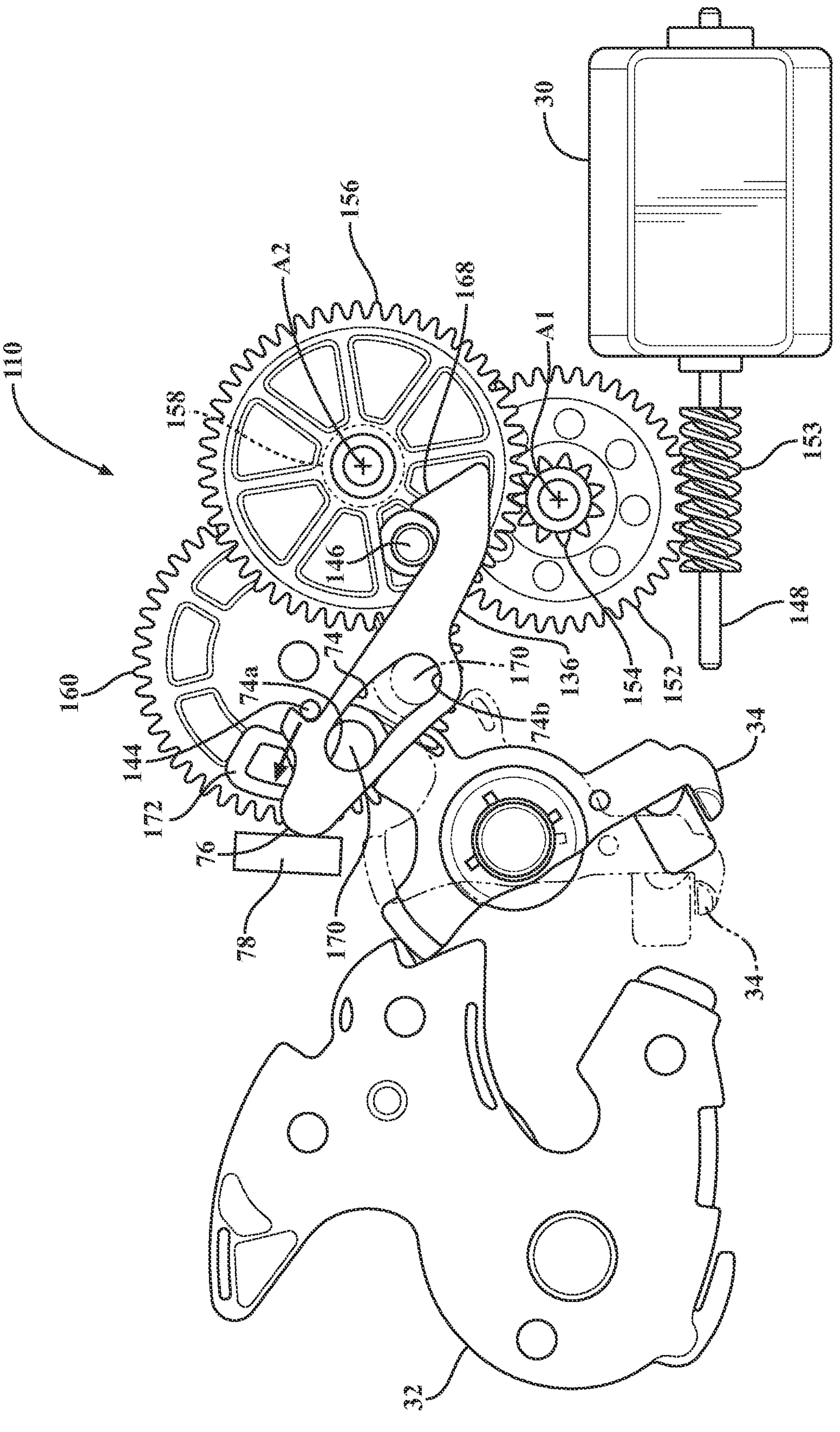
FIG. 9 is a side view of a power latch assembly in accordance with another aspect of the disclosure shown with a pawl shown in solid in a ratchet holding position and in transparency in a ratchet releasing position.
Figure 10:
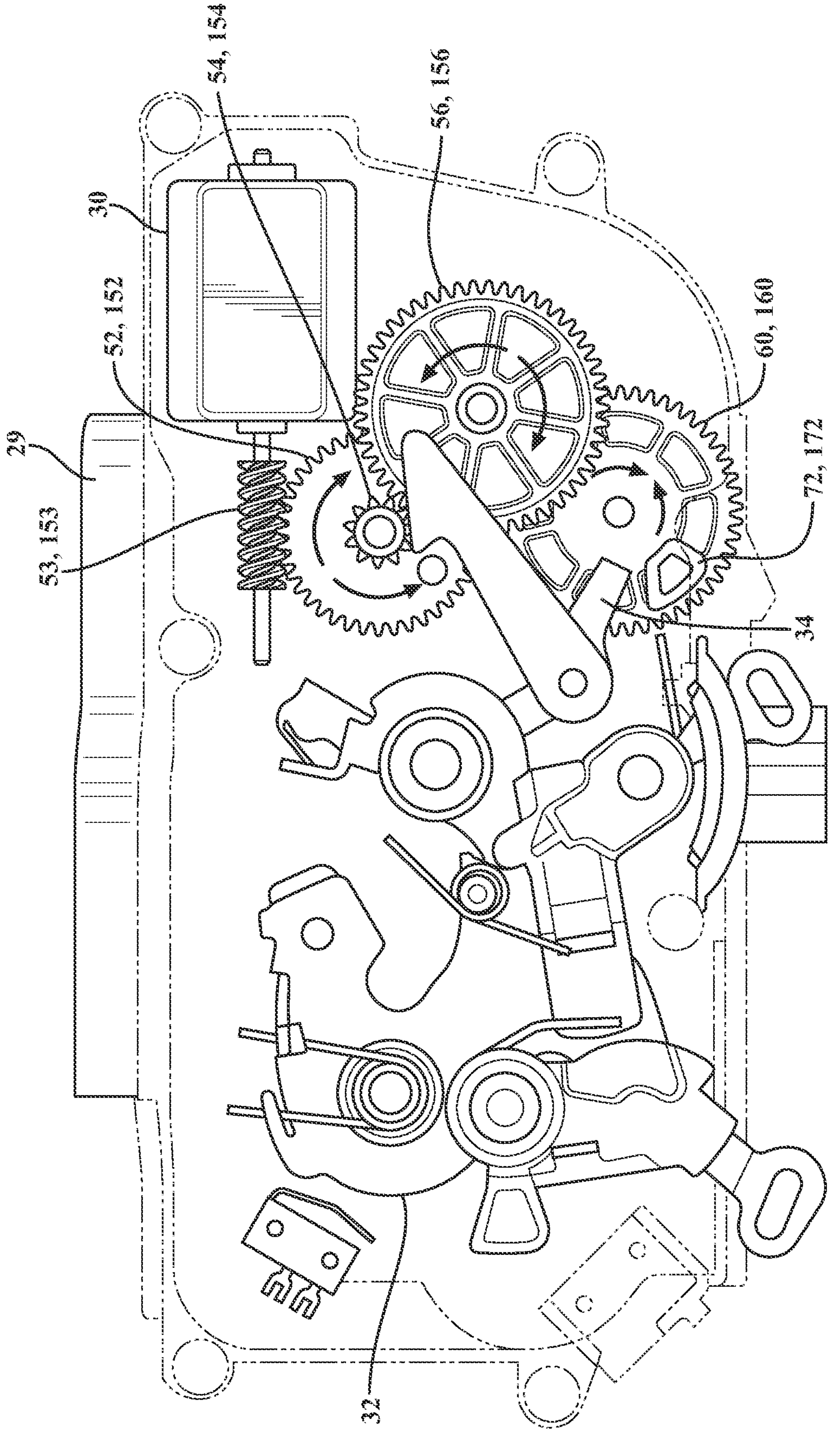
FIG. 10 is a side plan view of the power latch assembly illustrating the rotation of a multistage reduction mechanism operably connecting an output of the power release actuator to the pawl, with a first gear reduction shown being rotated in a first direction during movement of the pawl from the ratchet holding position to the ratchet releasing position under a normal load between the pawl and the ratchet, and with a second gear reduction shown being rotated in a second direction during movement of the pawl from the ratchet holding position to the ratchet releasing position under an increased load, relative the normal load, between the pawl and the ratchet.

In FIG. 9, a power latch assembly 110 constructed in accordance with another aspect of the disclosure is shown, wherein like reference numerals, offset by a factor of 100, are used to identify like features.

Power latch assembly 110 includes a first gear reduction GR1 and a second gear reduction GR2 as discussed above for power latch assembly 10, wherein first gear reduction GR1 includes: a drive gear 153, a first driven gear 152 meshed with drive gear 153, a first pinion gear 154, a second driven gear 156 meshed with first pinion gear 154, a second pinion gear 158, and a third driven gear 160 meshed with second pinion gear 158, each structured and interacting as discussed above for power latch assembly 10.

As discussed above, a first drive member 146 is shown fixed to second driven gear 156 for conjoint movement therewith, with first drive member 146 shown being fixed between an outer periphery and a second axis A2 about which second driven gear 156 rotates for operable communication with pawl 34 via a pawl release link 136 during a normal use condition. A second drive member 172 is fixed to the third driven gear 160 for operable driving communication with pawl 34 to move pawl 34 from the ratchet holding position to the ratchet releasing position during an emergency release condition, as discussed above for second drive member 72. Pawl release link 136 is operably coupled to pawl 34 via a pin 170; however, rather than being pivotably fixed to pawl 34 as discussed above for latch assembly 10, pawl release link 136 is configured for lost motion movement with pawl 34 during an emergency release condition.

To provide the lost motion movement between pawl release link 136 and pawl 34, pawl release link 136 has a slot 74 and pin 170, fixed to pawl 34 against relative translation movement therewith, is received in slot 74 for lost motion movement of pin 170 in slot 74 between opposite ends 74*a*, 74*b* of slot 74. Pawl release link 136 is supported by pin 170 and is biased by a release link biasing member 144 toward and into engagement with first drive member 146, wherein a hook member 168 at one end of pawl release link 136 is engaged with pin 179 and an opposite end 76 of pawl release link 136 is engaged by a fixed support member 78 fixed to latch housing, such as to latch frame plate 29, by way of example and without limitation. During a normal release operation, pawl release link 136 functions generally the same as discussed above for pawl release link 36, wherein hook member 168 of pawl release link 136 is driven by first drive member 146, thereby causing pawl release link 136 to move from its home position to its pawl release position, whereat end 74*a* of pawl release link 36 engages pin 170 and moves pawl 34 against the bias of pawl biasing member 42 to its ratchet releasing position (shown in transparency in FIG. 9), whereat ratchet 32 is free to move to the striker release position under the bias of ratchet biasing member 40. Return of pawl release link 136 to its home position is as discussed above for pawl release link 36, and thus, further discussion is believed unnecessary.

Then, in an emergency release condition, second drive member 172, fixed to the third driven gear 160, is driven into operable driving communication with pawl 34 to move pawl 34 from the ratchet holding position to the ratchet releasing position. Second drive member 172 can be configured for direct engagement with pawl 34 or pin 170, as discussed above, thereby directly driving pawl 34 to the ratchet release position (FIG. 8). As pawl 34 is driven from its ratchet holding position to its ratchet releasing position, pawl release link 136 is able to remain fixed or substantially fixed against movement as a result of the lost-motion movement between pawl 34 and pawl release link 136. In particular, pin 170, fixed to pawl 34, is free to translate within slot 74 away from end 74*a* toward opposite end 74*b*, as shown in transparency in FIG. 9. Accordingly, the inertia of pawl release link 136 does not factor in movement of pawl 34 to its ratchet releasing position during the emergency release condition, thereby reducing the load needed to cause rotation of third driven gear 160, and further reducing the potential generation of noise. Accordingly, the amount of torque from power release actuator 30 needed to cause release of latch assembly 110 is minimized.

Figure 11:
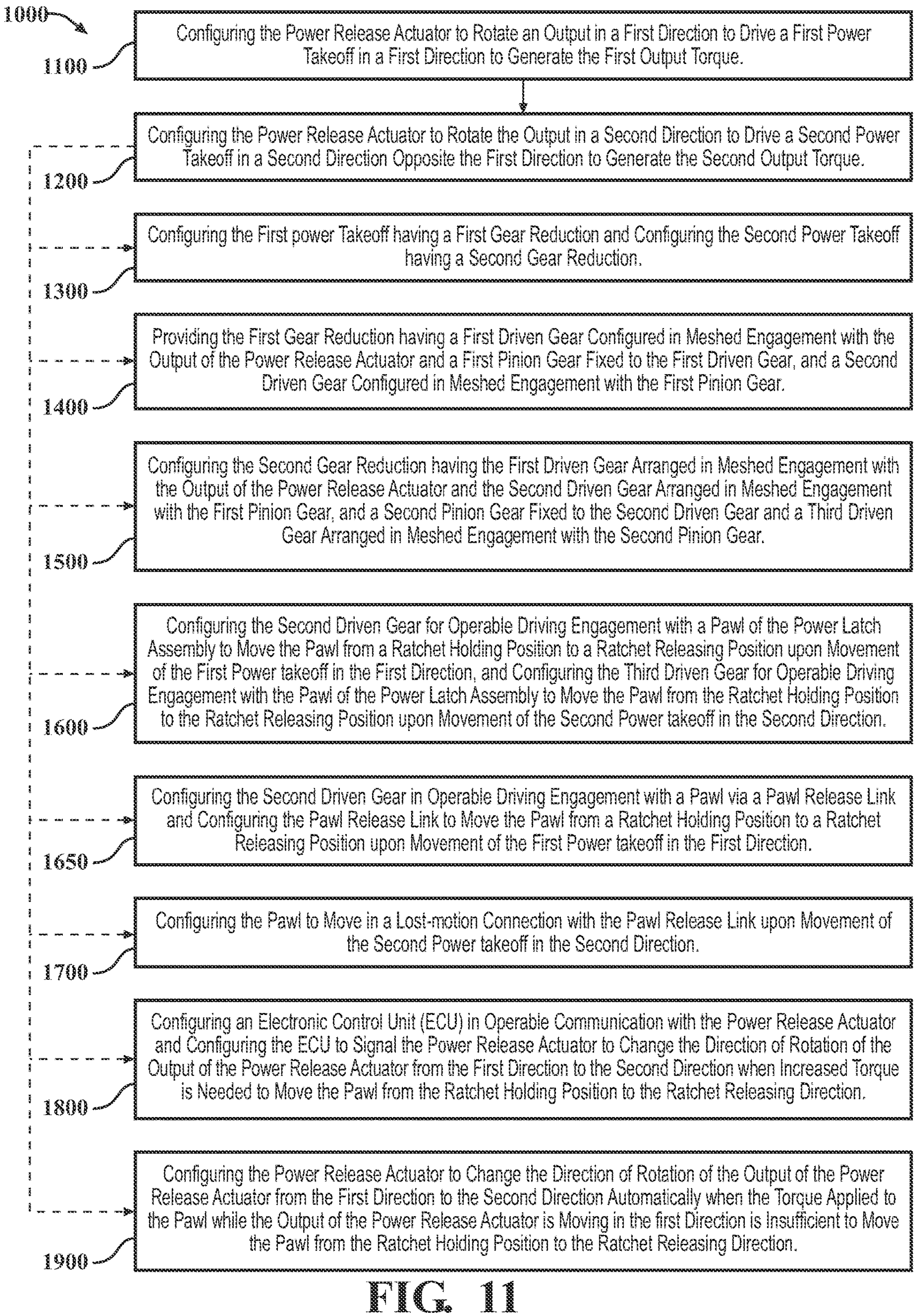
FIG. 11 is a method of moving a pawl from a ratchet holding position to a ratchet releasing position with a power latch assembly having first and second modes of operation in accordance with an aspect of the disclosure.

In accordance with another aspect of the disclosure, as shown in FIG. 11, a method 1000 of increasing the output torque of a latch power release actuator 30 of a power latch assembly 10 from a first output torque to an increased second output torque is provided. The method 1000 includes a step 1100 of configuring the power release actuator 30 to rotate an output 48 in a first direction to drive a first power takeoff in a first direction to generate the first output torque, and a step 1200 of configuring the power release actuator 30 to rotate the output 48 in a second direction to drive a second power takeoff in a second direction opposite the first direction to generate the second output torque.

In accordance with a further aspect, the method 1000 can further include a step 1300 of configuring the first power takeoff having a first gear reduction GR1 and configuring the second power takeoff having a second gear reduction GR2.

In accordance with a further aspect, the method 1000 can further include a step 1400 of providing the first gear reduction GR1 having a first driven gear 52 arranged in meshed engagement with the output 48 of the power release actuator 30 and a first pinion gear 54 fixed to the first driven gear 52, and a second driven gear 56 arranged in meshed engagement with the first pinion gear 54.

In accordance with a further aspect, the method 1000 can further include a step 1500 of configuring the second gear reduction GR2 having the first driven gear 52 arranged in meshed engagement with the output 48 of the power release actuator 30 and the second driven gear 56 arranged in meshed engagement with the first pinion gear 54, and a second pinion gear 58 fixed to the second driven gear 56 and a third driven gear 60 arranged in meshed engagement with the second pinion gear 58.

In accordance with a further aspect, the method 1000 can further include a step 1600 of configuring the second driven gear 56 for operable driving engagement with a pawl 34 of the power latch assembly 10 to move the pawl 34 from a ratchet holding position to a ratchet releasing position upon movement of the first power takeoff in the first direction, and configuring the third driven gear 60 for operable driving engagement with the pawl 34 of the power latch assembly 10 to move the pawl 34 from the ratchet holding position to the ratchet releasing position upon movement of the second power takeoff in the second direction.

In accordance with a further aspect, the method 1000 can further include a step 1650 of configuring the second driven gear in operable driving engagement with a pawl via a pawl release link and configuring the pawl release link to move the pawl from a ratchet holding position to a ratchet releasing position upon movement of the first power takeoff in the first direction.

In accordance with a further aspect, the method 1000 can further include a step 1700 of configuring the pawl to move in a lost-motion connection with the pawl release link upon movement of the second power takeoff in the second direction.

In accordance with a further aspect, the method 1000 can further include a step 1800 of configuring an electronic control unit (ECU) in operable communication with the power release actuator 30 and configuring the ECU to signal the power release actuator 30 to change the direction of rotation of the output 48 of the power release actuator 30 from the first direction to the second direction when increased torque is needed to move the pawl 34 from the ratchet holding position to the ratchet releasing direction.

In accordance with a further aspect, the method 1000 can further include a step 1900 of configuring the power release actuator 30 to change the direction of rotation of the output 48 of the power release actuator 30 from the first direction to the second direction automatically when the torque applied to the pawl 34 while the output 48 of the power release actuator 30 is moving in the first direction is insufficient to move the pawl 34 from the ratchet holding position to the ratchet releasing direction.

Figure 12:
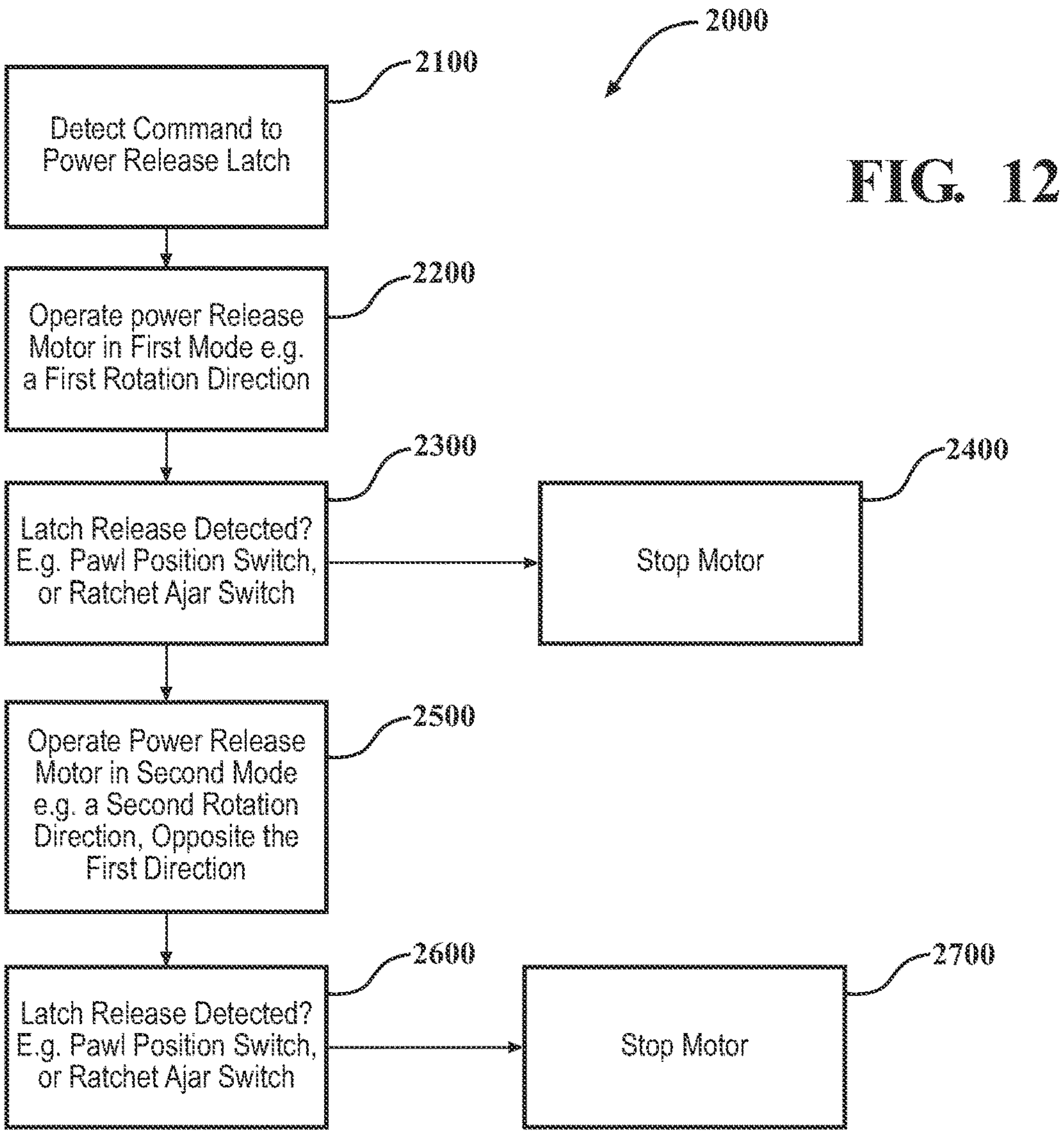
FIG. 12 is a method of releasing a power latch assembly of a closure panel of a motor vehicle.

In accordance with another aspect of the disclosure, as shown in FIG. 12, a method 2000 of releasing a power latch assembly 10, 110 of a closure panel of a motor vehicle is provided. The method 2000 includes: a step 2100 of detecting a command to power release the power latch assembly 10, 110; a step 2200 of operating a motor 30 of the power latch assembly 10, 110 in a first mode; a step 2300 of detecting whether the power latch assembly 10, 110 has been released. Step 2300 may include determining if the power latch assembly 10, 110 has not been released after expiry of a predetermined time out; a step 2400 of stopping the motor 30 if the detecting indicates the power latch assembly 10, 110 has been released; a step 2500 of operating the motor 30 of the power latch assembly 10, 110 in a second mode if the detecting indicates the power latch assembly 10, 110 has not been released; a step 2600 of detecting whether the power latch assembly 10, 110 has been released; and a step 2700 of stopping the motor 30 if the detecting indicates the power latch assembly 10, 110 has been released.

According to another aspect of the present disclosure, the method 2000 can further include providing the first mode to include rotating an output 48, 148 of the motor 30 in a first direction and providing the second mode to include rotating the output 48, 148 of the motor 30 in a second direction opposite the first direction.

Figure 13:
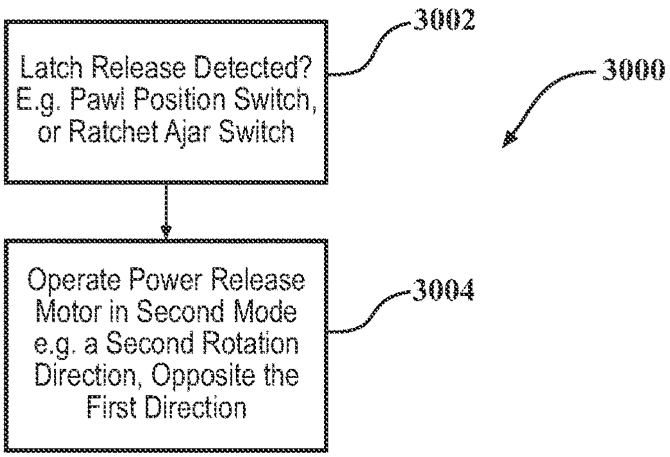
FIG. 13 is a method of releasing a power latch assembly of a closure panel of a motor vehicle in accordance with another aspect of the disclosure.
Figure 14:
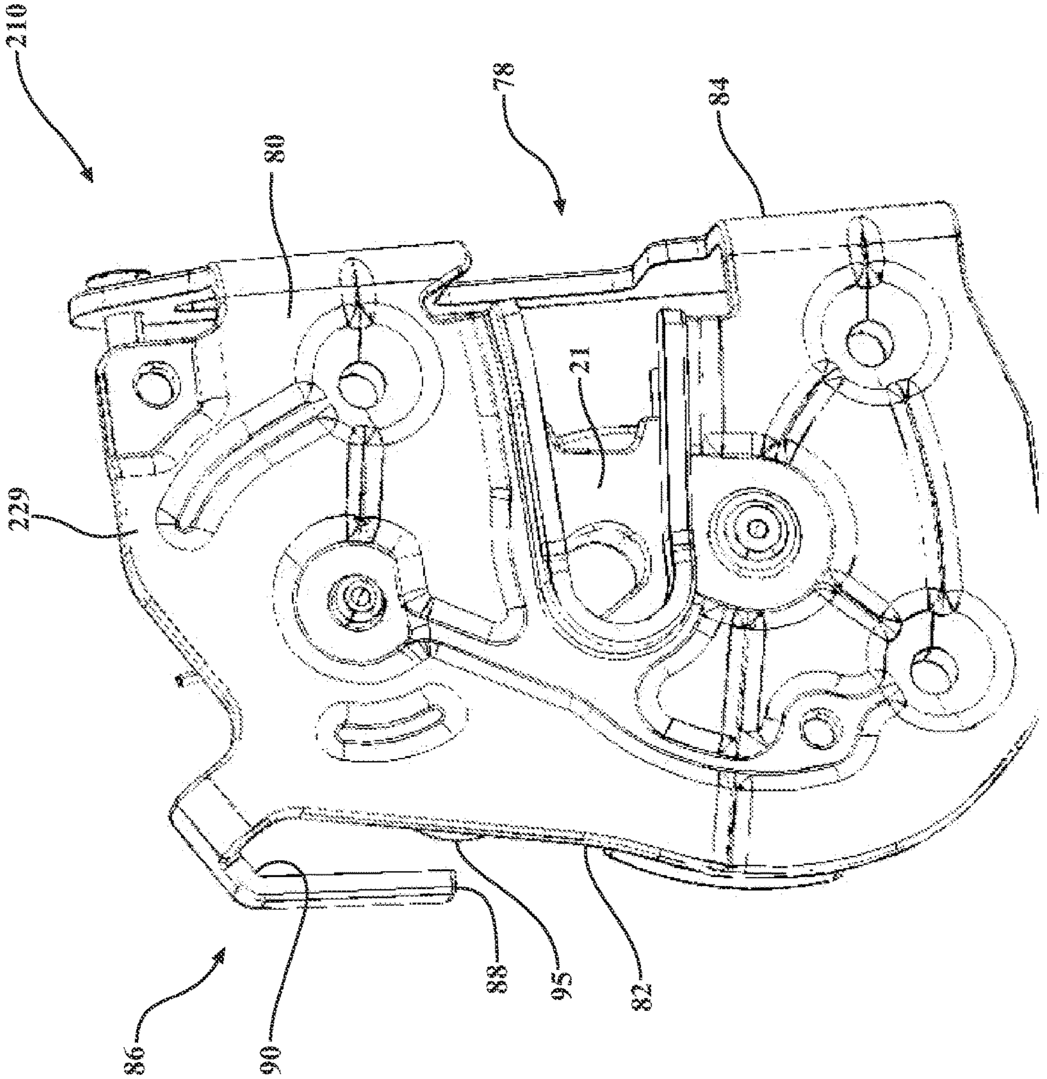
FIG. 14 is a front side view of a frame plate of a power latch assembly in accordance with another aspect of the disclosure.
Figure 15:
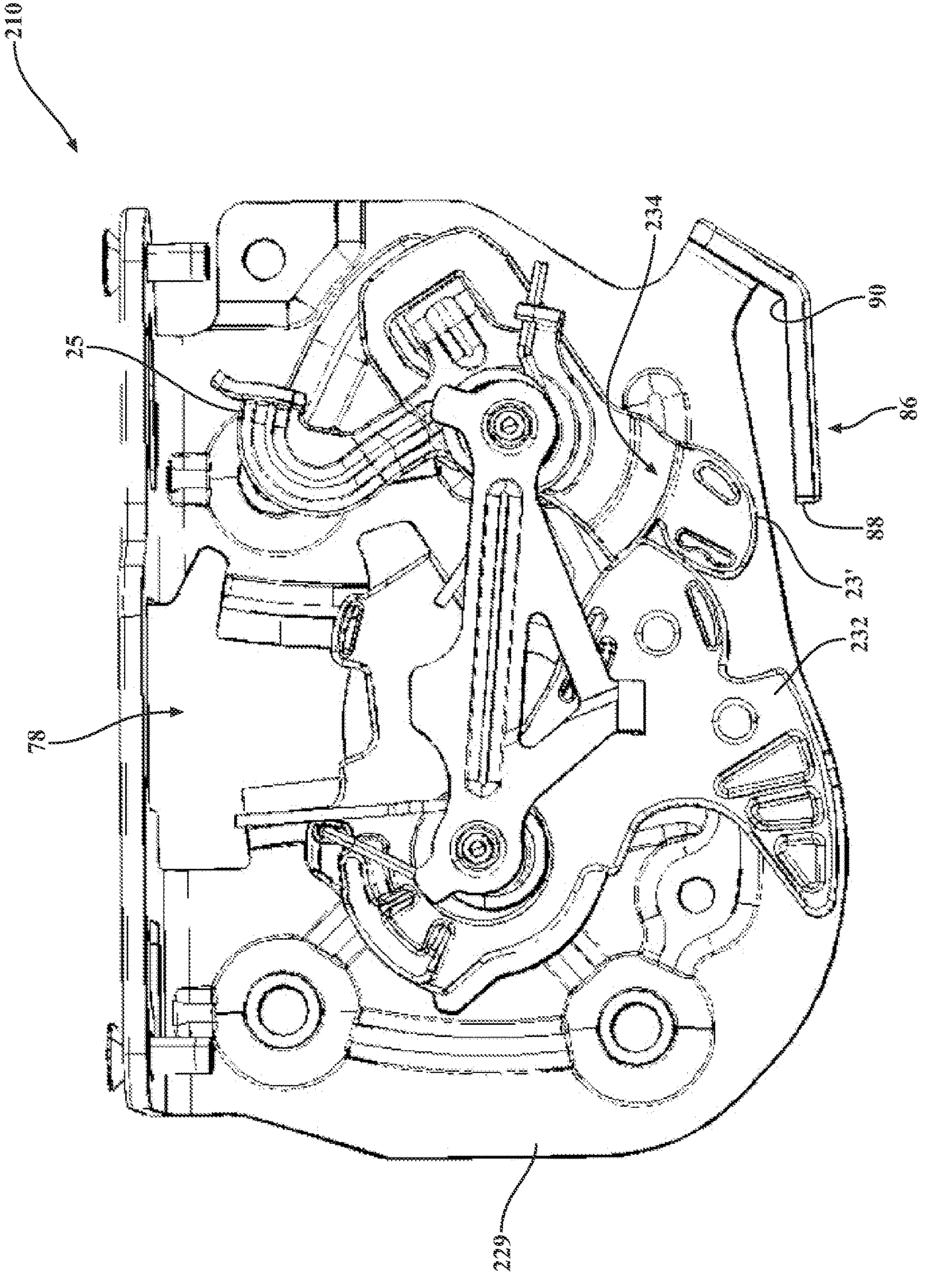
FIG. 15 is a back side view of the frame plate of FIG. 14 illustrating some latch components assembled thereto.
Figure 16A:
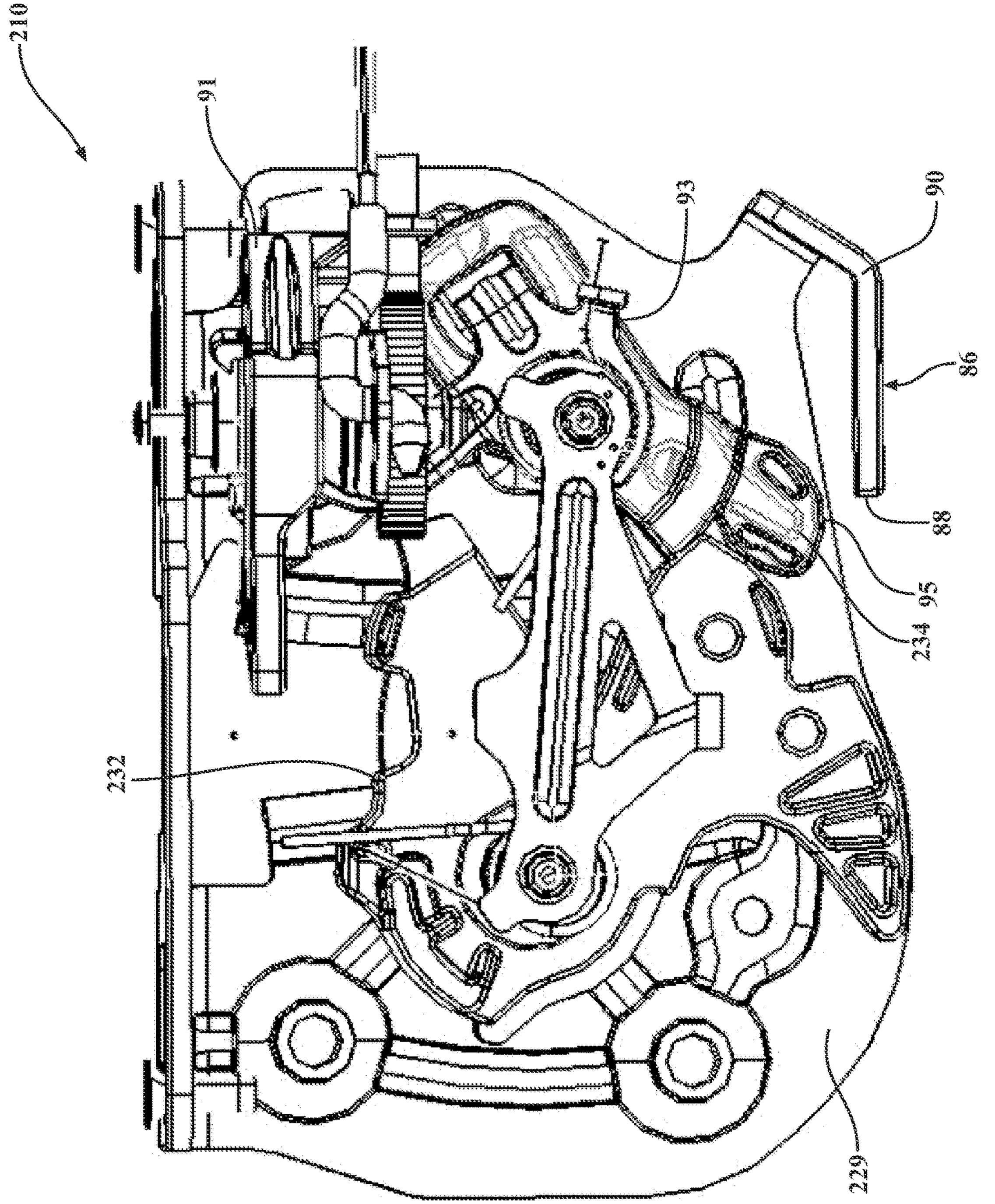
FIG. 16A is a plan view similar to FIG. 15 illustrating some additional latch components with the power latch assembly shown in a normal use state with a pawl in a ratchet holding position.
Figure 16B:
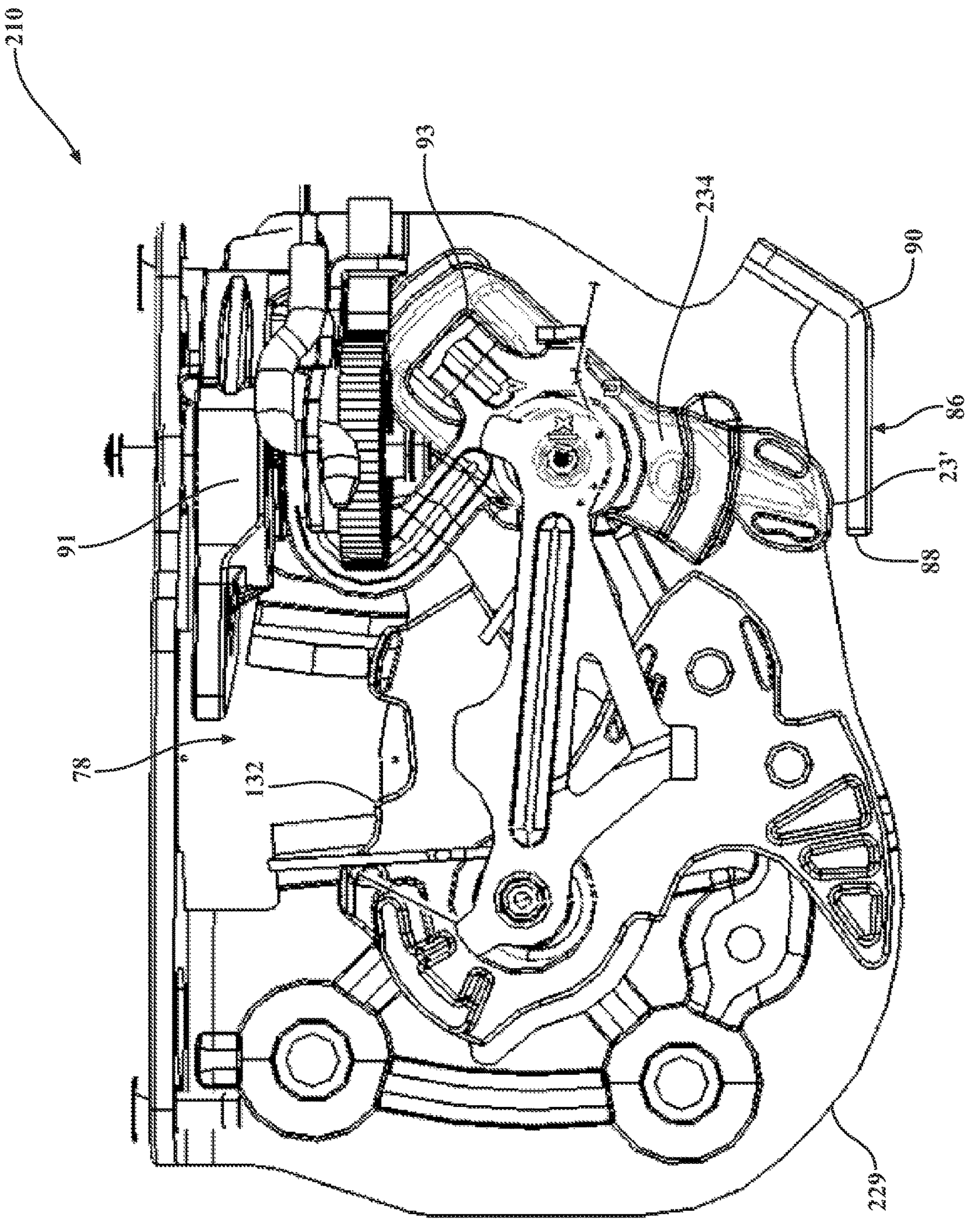
FIG. 16B is a view similar to FIG. 16A with the pawl moved to a ratchet releasing position during a normal release operation to allow the ratchet to move from a striker holding position to a striker releasing position, whereupon the passenger swing door can be moved from a closed position to an open position.
Figure 17A:
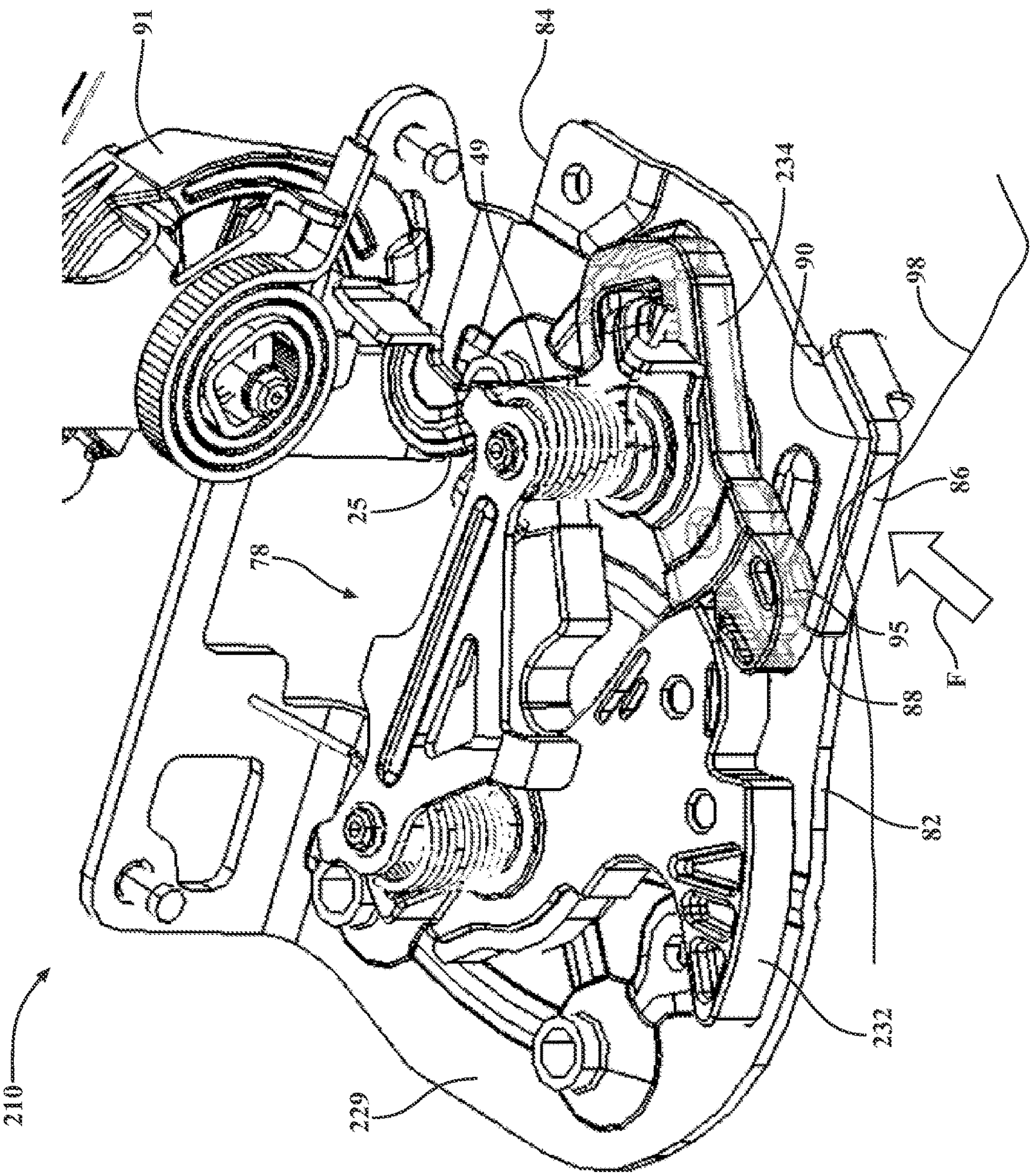
FIG. 17A is a view similar to FIG. 16A schematically illustrating a panel of the passenger swing door being impacted and deformed in a crash condition.
Figure 17B:
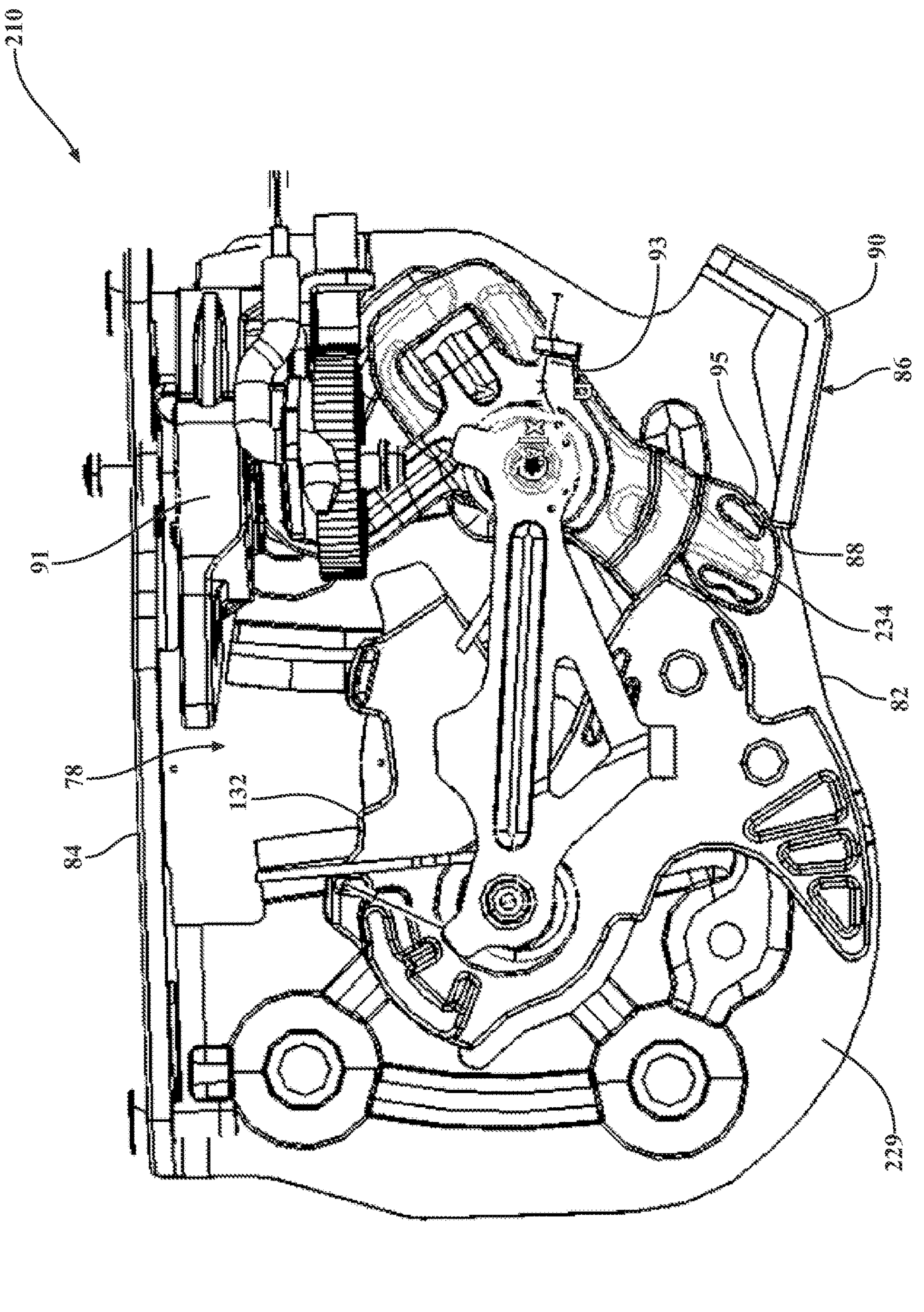
FIG. 17B is a view similar to FIG. 17A illustrating a mechanical feature of the power latch assembly deployed to a blocking position via the deformed panel of the passenger swing door to prevent the pawl from moving from the ratchet holding position to the ratchet releasing position, thereby maintaining the ratchet in the striker capture position and the passenger swing door in the closed position.

In accordance with another aspect of the disclosure, as shown in FIG. 13, a method 3000 operating a latch power release actuator 30 of a power latch assembly 10 having a first output torque and an increased second output torque is provided. The method 3000 includes a step 3002 of detecting a crash condition of the vehicle, such as by receiving a crash signal from a control unit, such as the ECU 64 receiving a crash or emergency signal from a Body Control Module, as shown as box 39 of FIG. 39, and in response to receiving the signal in step 3004, next operating the power release actuator 30 to couple the increased second output torque to the pawl as described herein above for example, such as by configuring the power release actuator 30 to rotate the output 48 in a second direction to drive a second power takeoff in a second direction opposite the first direction to generate the second output torque. As a result the power from the latch power release actuator 30 is transferred to the pawl using the increased second output torque during an emergency or crash condition. Power and time is therefore not expended by having first to operate the latch power release actuator using the first output torque before again operating the release actuator 30 using the increased second output torque after determining the first output torque is unable to release the latch during the emergency or crash condition of the vehicle.

In accordance with another aspect of the disclosure, a non-limiting embodiment of power latch assembly 210 will now be further described with reference to FIGS. 14-17B, wherein the same reference numerals as used above, offset by a factor of 200, will be used to identify like features, wherein various components have been removed for clarity only and to better illustrate aspects discussed hereafter. The power latch assembly 210 includes the outer housing, also referred to as casing, support member, and referred to hereafter as frame plate 229, configured to support various components therein and/or thereon, such as, by way of example and without limitation, ratchet 232, and pawl 234. The frame plate 229 has an outermost periphery, referred to hereafter as outer periphery 82, wherein outer periphery faces outwardly toward an outer panel 98 of vehicle swing door 12, and an innermost periphery, referred to hereafter as inner periphery 84, faces inwardly toward an inner panel 97 of vehicle swing door 12.

The power latch assembly 210 further includes a mechanical feature, also referred to as deformable feature, blocking feature, and hereafter as pawl locking member 86 (FIGS. 14-17B), operably coupled to the frame plate 229 to be influenced by an impact force in a crash condition of the motor vehicle 14 to prevent inadvertent movement of the release chain component, such as pawl 234, as discussed above, from the ratchet holding position to the ratchet releasing position, thereby inhibiting unwanted, inadvertent release of ratchet 232 away from the striker capture position during sudden impact to the power latch assembly 210. The blocking feature may in one possible configuration of the power latch assembly 210 prevent inadvertent movement of the release chain component associated with a mechanical release function, such as activation by an outside or inside handle, while permitting a powered release of the release chain component to cause the pawl 234 to move to a releasing position. The blocking feature may in another possible configuration of the power latch assembly 210 prevent inadvertent movement of the release chain component associated with a powered release function of the latch assembly 210 while allowing a manual activation of the release chain component, such as via activation by an outside or inside handle to cause the pawl 234 to move to a releasing position. The pawl locking member 86 described herein, shown directly coupled to frame plate 229, allows the frame plate 129 to maintain a standard foot print, size and shape, and without requiring to enlarge the frame plate 229 footprint, or requiring additional components and/or levers to extend from the frame plate 229 requiring additional packaging space within the swing door 12. The pawl locking member 86 is configured, upon a portion of pawl blocking member 86 being impacted and elastically and/or plastically deformed by force F during a crash condition, to be biased inwardly to present an obstruction to the movement of pawl 234 from the ratchet holding position to the ratchet releasing position.

The pawl locking member 86 can be formed as a monolithic piece of material with housing 229, such as in a stamping or forging process, by way of example and without limitation, or the pawl locking member 86 can be formed as a separated piece of material and subsequently fixed to the frame plate 229, such as via a mechanical fixation mechanism, weld joint, and/or otherwise, by way of example and without limitation. It is to be understood that frame plate 229 can be formed of any metal material desired for the intended application. As such, during a side impact of motor vehicle 14, wherein a force F (FIG. 17A) deforms the outer panel 98 inwardly toward the inner panel 97, the pawl locking member 86 is plastically deformed (bent) and brought into a blocking position (FIG. 17B) relative to the pawl 234 to prevent movement of the pawl 234 from the ratchet holding position toward the ratchet releasing position, thereby preventing movement of the ratchet 232 away from the striker holding position. Accordingly, pawl 234 is maintained in the ratchet holding position during and throughout a crash condition via pawl locking member 86 obstructing movement of ratchet 232 away from the striker capture position, thus, preventing inadvertent opening of door 12. As such, pawl 234 remains in its ratchet holding position as long as the swing door 12 is not intended to be opened via intentional actuation of a release mechanism.

The pawl locking member 86 is shown cantilevered from the frame plate 229 to extend outwardly from the frame plate 229 to a free end 88. The free end 88 can be spaced slightly from the outer panel 98 during normal use, but sufficiently close thereto to cause immediate deflection and deformation of the pawl blocking member 86 upon the outer panel 98 becoming deformed inwardly toward the inner panel 97. To facilitate plastic deformation of the pawl block member 86 from a non-deployed, non-blocking state (FIGS. 16A and 16B) to a deployed, blocking state (FIG. 17B), a living hinge 90 can be provided to interconnect the mechanical feature 86 to the frame plate 229. The living hinge 90 is a reduced thickness region, relative to immediately adjacent portion of frame plate 229, that reduces the bending force of the monolithic piece of material interconnecting the mechanical feature 86 to the frame plate 229. Further, the living hinge 90 ensures the mechanical feature 86 bends precisely along the location desired to bring the free end 88 into blocking position with the pawl 34 during a crash condition.

It is to be recognized that the power latch assembly 210 is intended to be selectively actuatable to release the pawl 234 from its closed, ratchet holding position, thereby allowing the ratchet 232 to be moved to the open, striker releasing position to allow the swing door 12 to be intentionally opened after the crash condition. The actuation of power latch assembly 210 while the pawl blocking member 86 is obstructing pawl 234 can occur via selective actuation of power release motor 30 and/or via mechanically actuated operation, such as by selective actuation of mechanically actuatable outside and/or inside door handles 24, 26, when desired to open swing door 12 after an accident. The mechanical force imparted on a release lever 91 and pawl release lever 93 via mechanical actuation is sufficient, in case actuation of power release motor 30 is unable to overcome friction between the free end 88 of pawl blocking member 86, to cause pawl 234 to move against the blocking force of pawl blocking member 86, thus, allowing pawl 234 to be moved from its ratchet holding position to its ratchet releasing position. Movement of the pawl 234 to its ratchet releasing position under the mechanically imparted force can be facilitated by a rounded cam surface of pawl 234, also referred to as bull nose 95, against which a free end 88 of pawl blocking member 86 is engaged, such that the force of the bull nose 95 pushing on the free end 88 can intentionally deflect the pawl blocking member 86 outwardly a sufficient amount to allow the pawl 234 to release the ratchet 232 for movement to its striker releasing position, thus, allowing door 12 to be intentionally opened in after a crash condition.

Now referring to FIG. 18, there is illustrated a method 4000 of preventing a ratchet 232 of a power latch assembly 210 of a motor vehicle swing door 12 from inadvertently moving from a striker capture position. The method 4000 includes a step 4100 of configuring a mechanical feature 86 of the power latch assembly 210 to be intentionally plastically deformed by an impact force to an outer panel 98 of the door 12 during the crash condition, and configuring the plastically deformed mechanical feature 86 to prevent inadvertent movement of a release chain component 91, 93, 95 to prevent unwanted movement of a pawl 234 from a ratchet holding position, whereat the ratchet 232 is maintained in latched engagement with the striker 18, to a ratchet releasing position, whereat the ratchet 232 is moved out of latched engagement from the striker 18.

In accordance with a further aspect, the method 4000 can further include a step 4200 of fixing the mechanical feature 86 to a frame plate 229 of the power latch assembly 210 and configuring the mechanical feature 86 to pivot from a non-deployed, non-blocking position, whereat the release chain component 91, 93, 95 is able to move, thereby allowing the pawl 234 to move from the ratchet holding position to the ratchet releasing position, to a deployed, blocking position, whereat the release chain component 91, 93, 95 prevents the pawl 234 from being able to move from the ratchet holding position to the ratchet releasing position, during a crash condition.

In accordance with a further aspect, the method 4000 can further include a step 4300 of providing the mechanical feature 86 being cantilevered from the frame plate 229.

In accordance with yet a further aspect, the method 4000 can further include a step 4400 of providing the mechanical feature 86 being formed as a monolithic piece of material with the frame plate 229.

In accordance with yet a further aspect, the method 4000 can further include a step 4500 of providing a living hinge 90 interconnecting the mechanical feature 86 to the frame plate 229, and configuring the living hinge 90 to facilitate deformation of the mechanical feature 86 from a non-deployed, non-blocking state to a deployed, blocking state during a crash condition by reducing the bending force of the monolithic piece of material along the living hinge 90.

In accordance with yet another aspect, the method 4000 can further include a step 4600 of providing the mechanical feature 86 being extended from the frame plate 229 to a free end 88 and configuring the free end 88 to block movement of the release chain component 234 from the ratchet holding position to the ratchet releasing position during the crash condition.

In accordance with yet another aspect, the method 4000 can include a step 4700 of providing the release chain component as a pawl 234 configured for engagement with the ratchet 232 when the ratchet 232 is in the striker capture position, and configuring the free end 88 to confront and engage the pawl 234 to prevent the pawl 234 from moving from the ratchet holding position to the ratchet releasing position during the crash condition.

In accordance with yet another aspect, the method 4000 can include a step 4800 of configuring the release chain component 91, 93, 95 to be intentionally moved after a crash condition so that the pawl 234 can be intentionally moved from the ratchet holding position to the ratchet releasing position.

In accordance with yet another aspect, the method 4000 can further include a step 4900 of configuring the release chain component 91, 93, 95 to be intentionally moved via one of powered movement and mechanically actuated movement.

In accordance with yet another aspect, the method 4000 can further include a step 4950 of configuring the mechanical feature 88 to be deflected under a force of the release chain component 91, 93, 95 via one of powered movement and mechanically actuated movement of the release chain component 91, 93, 95.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A power latch assembly for a closure panel, comprising:

a ratchet configured for movement between a striker capture position and a striker release position and being biased toward said striker release position;

a pawl configured for movement between a ratchet holding position, whereat said pawl maintains said ratchet in said striker capture position, and a ratchet releasing position, whereat said pawl releases said ratchet for movement of said ratchet to said striker release position;

a power release actuator configured to move said pawl from the ratchet holding position to the ratchet releasing position; and a multistage reduction mechanism operably connecting an output of the power release actuator to the pawl, the multistage reduction mechanism having at least two power takeoffs, with each power takeoff being configured to apply a different torque output to the pawl, wherein the at least two power takeoffs includes a first power takeoff provided by a first gear reduction and a second power takeoff provided by a second gear reduction, wherein the first and second gear reductions are different from one another, wherein the first gear reduction is provided by rotating the output of the power actuator in a first direction and the second gear reduction is provided by rotating the output of the power actuator in a second direction opposite the first direction, wherein the first gear reduction includes a first stage gear having a first driven gear configured in meshed engagement with said output of said power release actuator and a first pinion gear fixed to said first driven gear, and a second stage gear having a second driven gear configured in meshed engagement with said first pinion gear, wherein the second gear reduction includes said first driven gear and said second driven gear, and further includes a second pinion gear fixed to said second driven gear and a third driven gear configured in meshed engagement with said second pinion gear, further including a first drive member fixed to said second driven gear, said first drive member being configured in operable driving communication with said pawl to move said pawl from the ratchet holding position to the ratchet releasing position, and a second drive member fixed to said third driven gear, said second drive member being configured in operable driving communication with said pawl to move said pawl from the ratchet holding position to the ratchet releasing position, further including a pawl release link coupled to said pawl and biased into engagement with said first drive member, said pawl release link having a slot configured for lost motion movement of a pin extending from said pawl therein, with said pawl release link being configured to move said pawl from the ratchet holding position to the ratchet releasing position in response to movement of said second driven gear in a first direction and to return said pawl to said ratchet holding position in response to movement of said second driven gear in a second direction opposite the first direction.

2. The power latch assembly of claim 1, wherein the first gear reduction includes a first number of gears and the second gear reduction includes a second number of gears, wherein the first number of gears is less than the second number of gears.

3. The power latch assembly of claim 1, wherein said second drive member is configured for direct engagement with said pawl.

4. The power latch assembly of claim 1, wherein the first gear reduction causes the pawl to move from the ratchet holding position to the ratchet releasing position in (X) seconds upon actuating the power actuator in the first direction at a first rate of rotation and the second gear reduction causes the pawl to move from the ratchet holding position to the ratchet releasing position in (X+Y) seconds upon actuating the power actuator in the second direction at the first rate of rotation, wherein (X) seconds is less that (X+Y) seconds.

5. The power latch assembly of claim 1, said pawl release link having a hook member, said first drive member being configured to engage said hook member and drive said pawl release link from a home position to a pawl release position via the first gear reduction as the output of the power actuator rotates in the first direction to move said pawl from the ratchet holding position to the ratchet releasing position.

6. A method of increasing the output torque of a latch power release actuator of a power latch assembly from a first output torque to an increased second output torque, comprising:

configuring the power release actuator to rotate an output in a first direction to drive a first power takeoff in a first direction to generate the first output torque, and configuring the power release actuator to rotate the output in a second direction to drive a second power takeoff in a second direction opposite the first direction to generate the second output torque;

configuring the first power takeoff having a first gear reduction including a first driven gear coupled to the output and a second driven gear coupled to the first gear; and configuring the second power takeoff having a second gear reduction including the first driven gear, the second driven gear, and a third driven gear coupled to the second gear, further including configuring the second driven gear in operable driving engagement with a pawl via a pawl release link having a slot with a pin received in the slot, and configuring the pawl release link to move the pawl from a ratchet holding position to a ratchet releasing position upon movement of the first power takeoff in the first direction, and configuring the pawl release link to remain substantially fixed against movement during movement of the second power takeoff in the second direction via lost motion movement of the pin in the slot.

7. The method of claim 6, further including providing a first pinion gear fixed to the first driven gear, and arranging the second driven gear in meshed engagement with the first pinion gear.

8. The method of claim 7, further including providing a second pinion gear fixed to the second driven gear and arranging the third driven gear arranged in meshed engagement with the second pinion gear.

9. The method of claim 8, further including configuring the second driven gear having a first drive member for operable driving engagement with a pawl of the power latch assembly to move the pawl from a ratchet holding position to a ratchet releasing position upon movement of the first power takeoff in the first direction, and configuring the third driven gear having a second drive member for operable driving engagement with the pawl of the power latch assembly to move the pawl from the ratchet holding position to the ratchet releasing position upon movement of the second power takeoff in the second direction.

10. The method of claim 9, further including providing the pawl release link having a hook member, and arranging the first drive member to engage the hook member and drive the pawl release link from a home position to a pawl release position as the first power takeoff moves in the first direction to cause the pawl to move from the ratchet holding position to the ratchet releasing position.

11. The method of claim 6, further including configuring an electronic control unit in operable communication with the power release actuator and configuring the electronic control unit to signal the power release actuator to change the direction of rotation of the output of the power release actuator from the first direction to the second direction when increased torque is needed to move the pawl from the ratchet holding position to the ratchet releasing direction.

12. The method of claim 11, further including configuring the power release actuator to change the direction of rotation of the output of the power release actuator from the first direction to the second direction automatically when the torque applied to the pawl while the output of the power release actuator is moving in the first direction is insufficient to move the pawl from the ratchet holding position to the ratchet releasing direction.

* * * * *